United States Patent [19]

Sekizawa et al.

[11] Patent Number: 4,926,251
[45] Date of Patent: May 15, 1990

[54] COLOR IMAGE PROCESSING APPARATUS WITH IMAGE CORRECTOR

[75] Inventors: Hidekazu Sekizawa; Tutomu Saito, both of Yokohama; Naofumi Yamamoto, Tokyo; Kazuhiko Higuchi, Kawasaki; Haruko Kawakami, Funabashi, all of Japan

[73] Assignee: Kabushiki Kaisha Toshiba, Kawasaki, Japan

[21] Appl. No.: 178,431

[22] Filed: Apr. 6, 1988

[30] Foreign Application Priority Data

| Apr. 7, 1987 | [JP] | Japan | 62-83814 |
| Jun. 25, 1987 | [JP] | Japan | 62-156530 |
| Jun. 25, 1987 | [JP] | Japan | 62-156531 |
| Jun. 25, 1987 | [JP] | Japan | 62-156532 |
| Jun. 26, 1987 | [JP] | Japan | 62-157933 |
| Aug. 27, 1987 | [JP] | Japan | 62-213534 |

[51] Int. Cl.$^5$ .............................................. H04N 1/46
[52] U.S. Cl. ........................................ 358/75; 358/80
[58] Field of Search ................ 358/75, 80, 280, 282, 358/283, 284, 294; 382/50, 53

[56] References Cited

U.S. PATENT DOCUMENTS

| 4,194,221 | 3/1980 | Stoffel | 358/283 |
| 4,510,866 | 4/1985 | Sekizawa et al. | 358/206 X |
| 4,514,738 | 4/1985 | Nagato et al. | 346/76 PH |
| 4,631,578 | 12/1986 | Sasaki et al. | 358/80 |
| 4,661,843 | 4/1987 | Sekizawa et al. | 358/80 |
| 4,663,662 | 5/1987 | Sekizawa et al. | 358/75 |
| 4,675,727 | 6/1987 | Sekizawa et al. | 358/75 |
| 4,698,669 | 10/1987 | Sekizawa et al. | 358/80 X |
| 4,700,236 | 10/1988 | Abe | 358/80 X |
| 4,723,173 | 2/1988 | Tanioka | 358/283 |
| 4,724,446 | 2/1988 | Hirahara et al. | 358/283 X |
| 4,727,430 | 2/1988 | Miwa | 358/80 X |
| 4,734,762 | 3/1988 | Aoki et al. | 358/80 |
| 4,745,467 | 5/1988 | Sekizawa et al. | 358/80 |
| 4,782,398 | 11/1988 | Mita | 358/283 X |
| 4,786,976 | 11/1988 | Takao et al. | 382/53 X |
| 4,792,847 | 12/1988 | Shimazaki et al. | 358/80 |
| 4,821,334 | 4/1989 | Ogino et al. | 382/50 |

FOREIGN PATENT DOCUMENTS 59-135573 8/1984 Japan .
61-80969 4/1986 Japan .

Primary Examiner—James J. Groody
Assistant Examiner—Mark R. Powell
Attorney, Agent, or Firm—Oblon, Spivak, McClelland, Maier & Neustadt

[57] ABSTRACT

A color copying machine has a scanning-type proximity linear image sensor unit for optically scanning an input image and producing an image read signal, and a color printer unit for producing a copy image corresponding to the input image at limited levels of printing density. An image type discrimination circuit receives the image read signal, and at least partially discriminates the type of image based on a pattern matching technique, thereby producing a discrimination signal for specifying the image type in a pixel region of a predetermined size of the input image. An adaptive signal processing circuit also receives the image read signal, and performs different image signal correction processing in accordance with the discriminated image type, thus producing a corrected image signal, which is supplied to a multi-value dithering processor. The multi-value dithering processing circuit performs multi-value dither processing of the corrected image signal, and produces a printer drive signal for defining a printing pixel pattern for each pixel of the input image.

16 Claims, 23 Drawing Sheets

FIG. 3
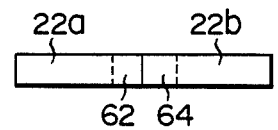
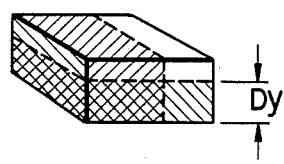
FIG. 2
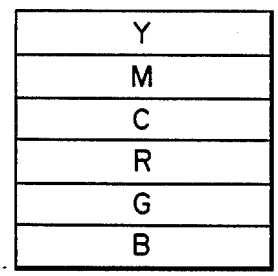
FIG. 4
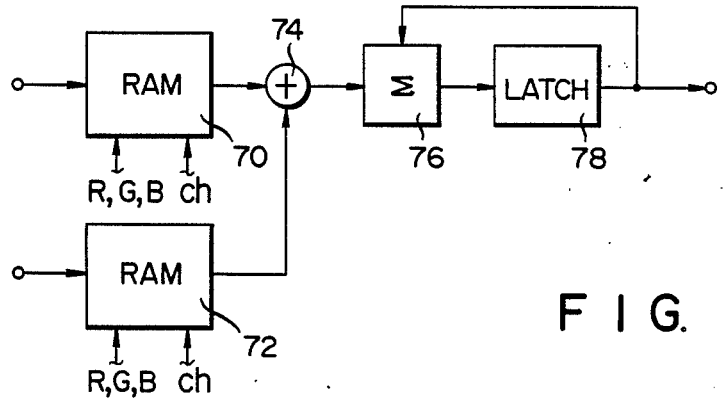
FIG. 5
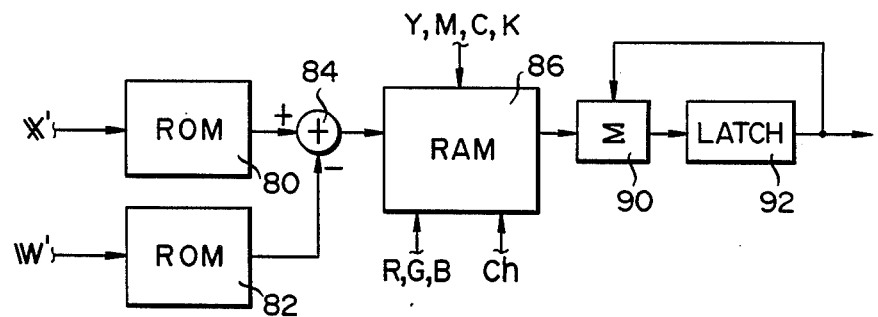
FIG. 6

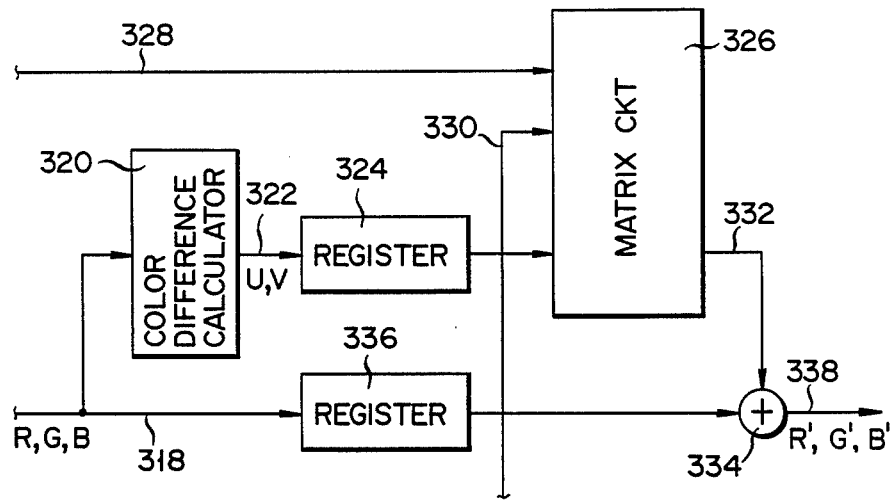
F I G. 14
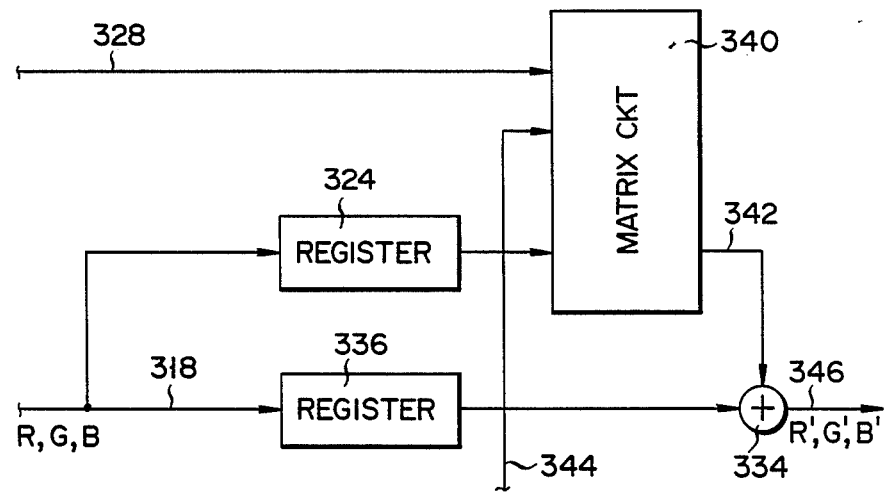
F I G. 15

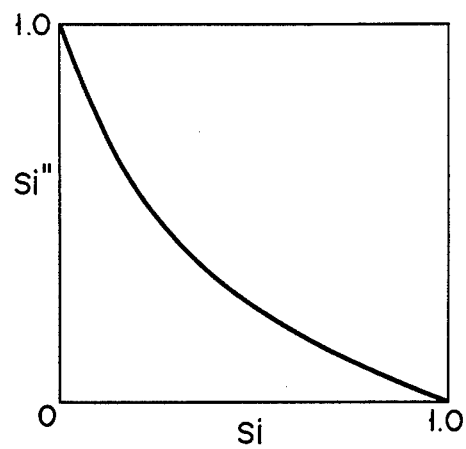
F I G. 17
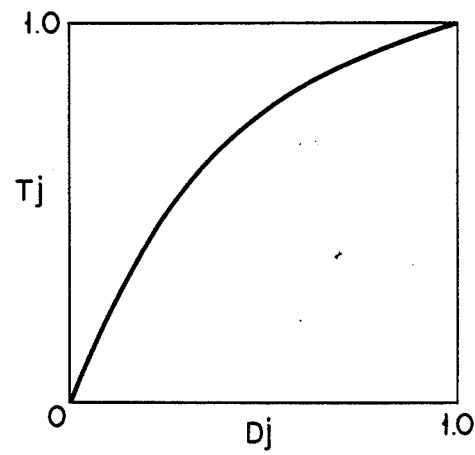
F I G. 18
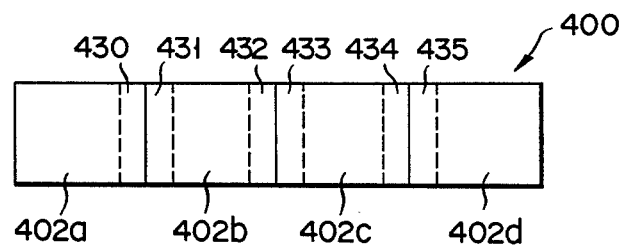
F I G. 19

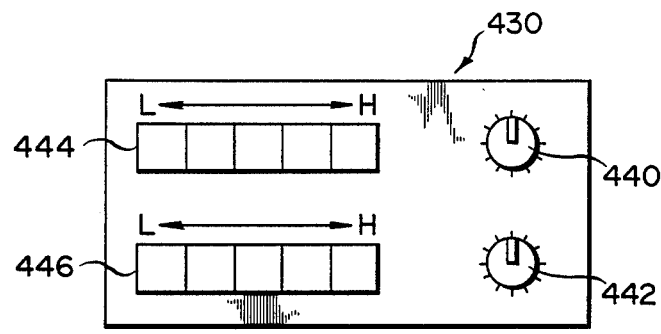
F I G. 20
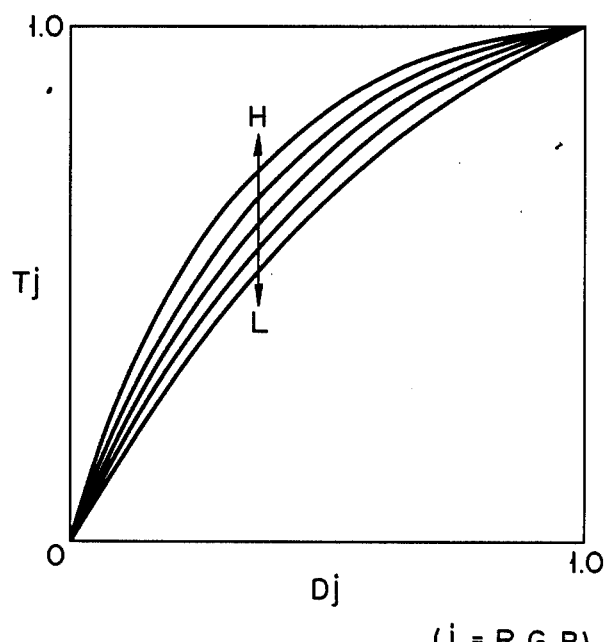
(j = R, G, B)
F I G. 21

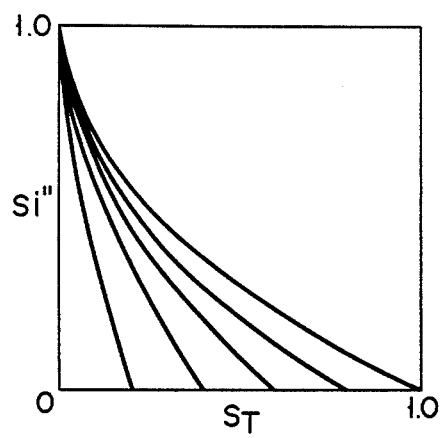
F I G. 22
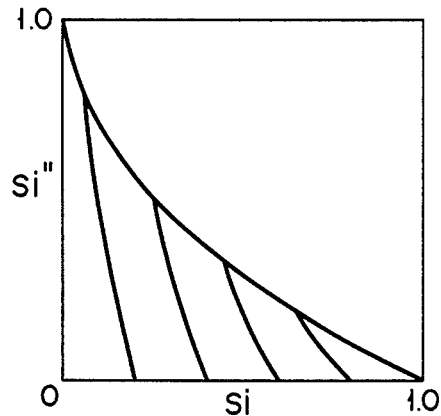
F I G. 23
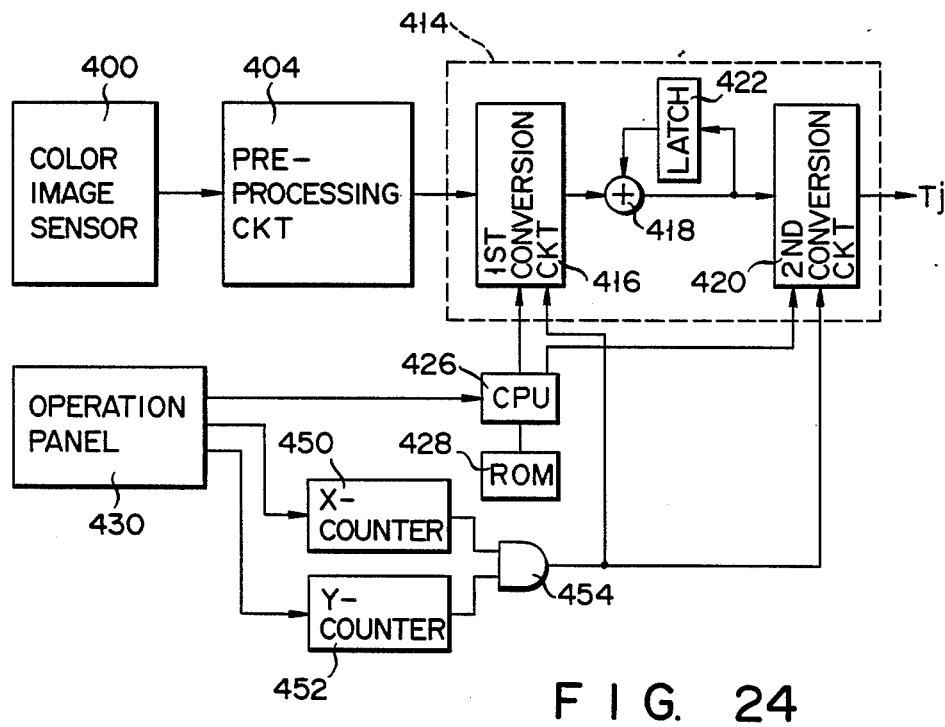
F I G. 24

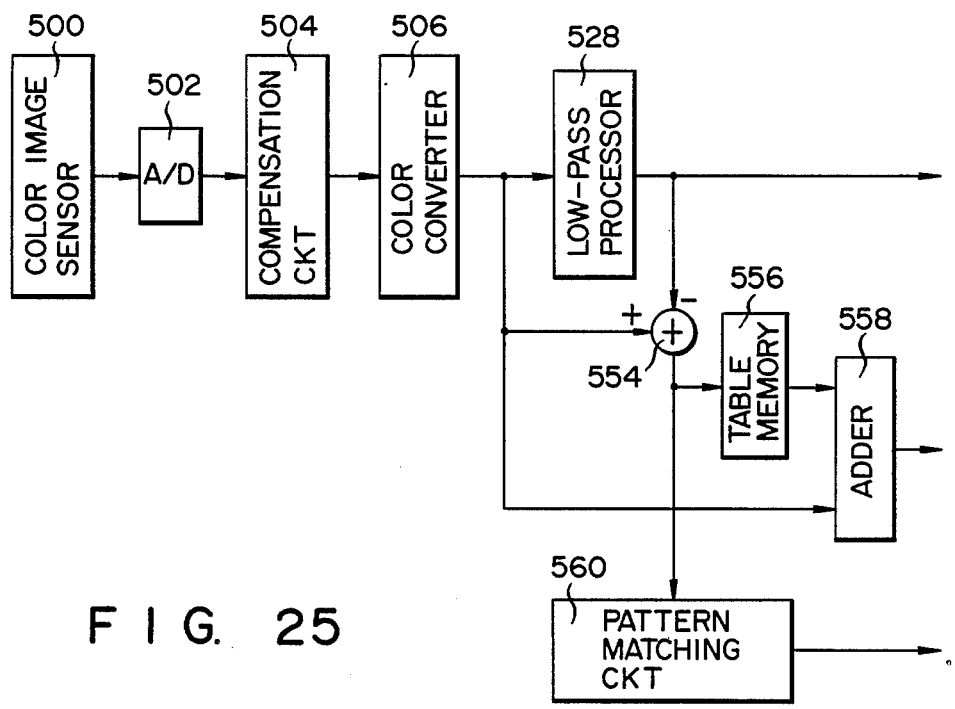
F I G. 25
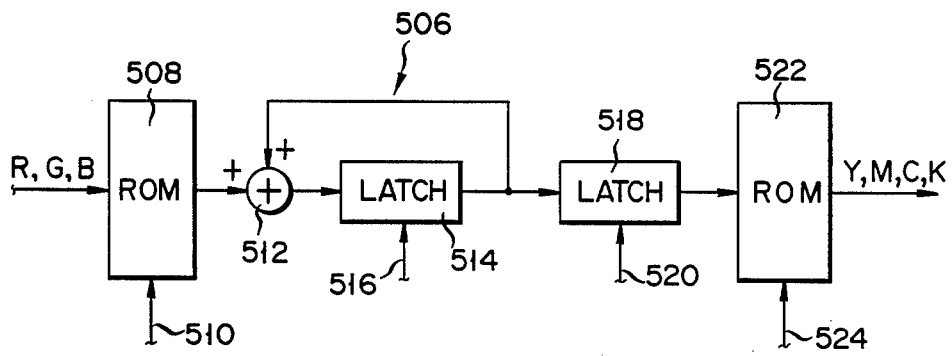
F I G. 26

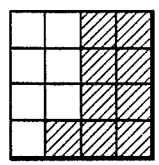 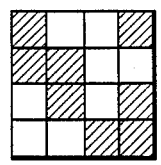 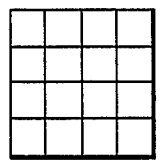
FIG. 37A    FIG. 37C    FIG. 37E
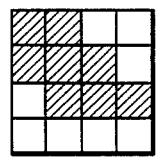 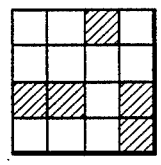 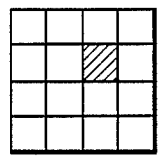
FIG. 37B    FIG. 37D    FIG. 37F
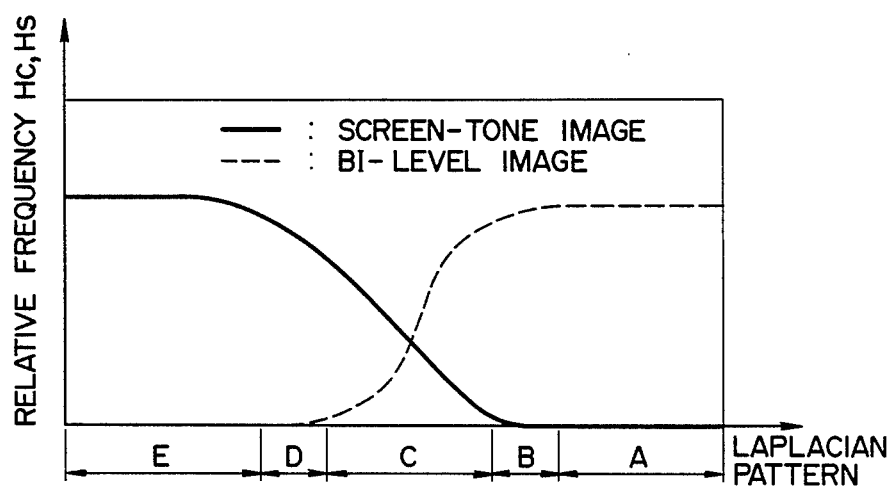
FIG. 38

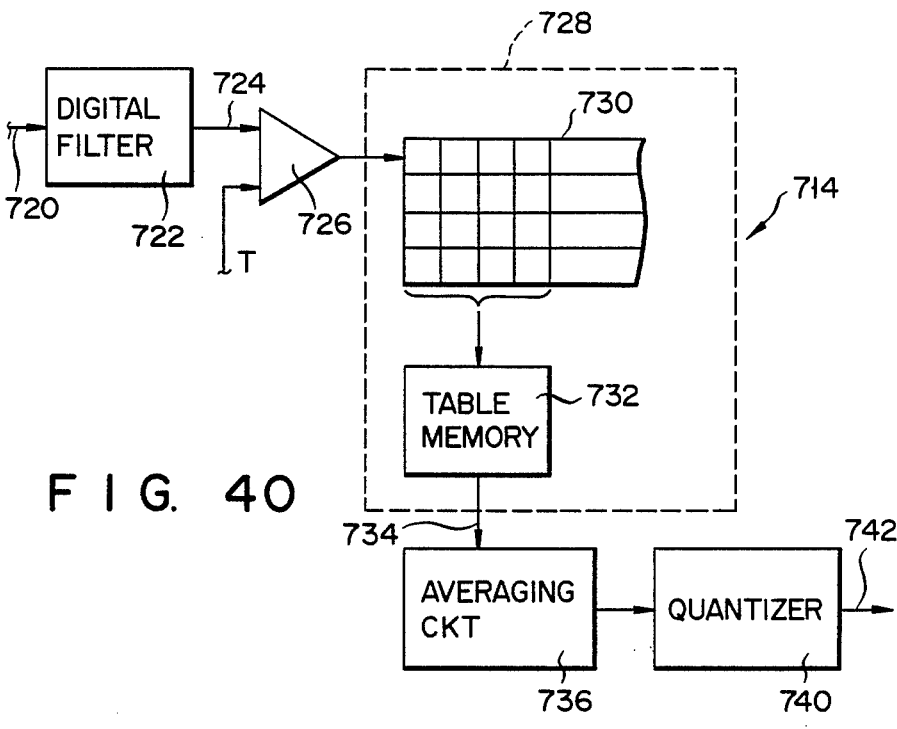
FIG. 40
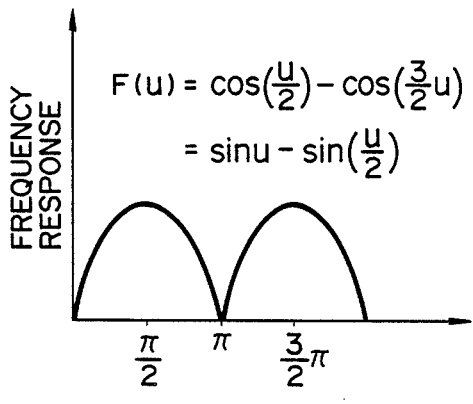
FIG. 41
FIG. 42

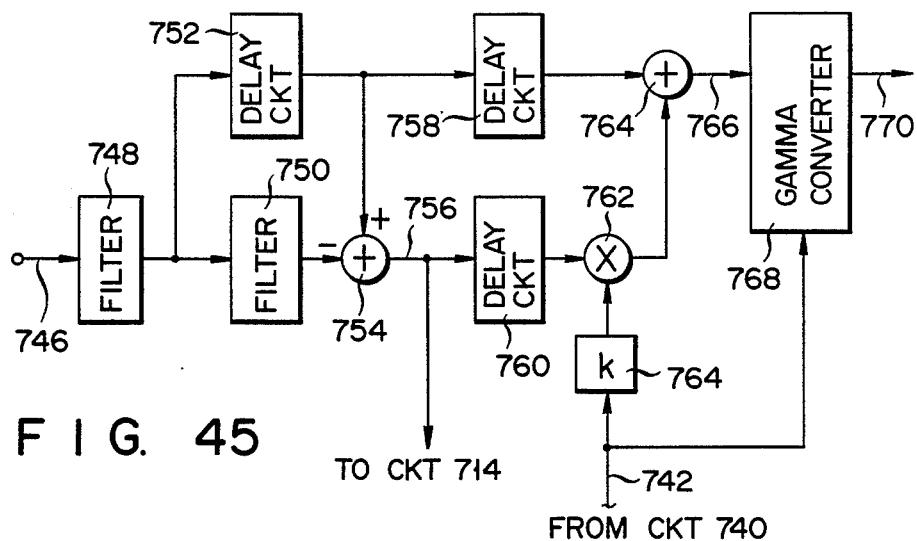
FIG. 45
FIG. 46A
FIG. 46B
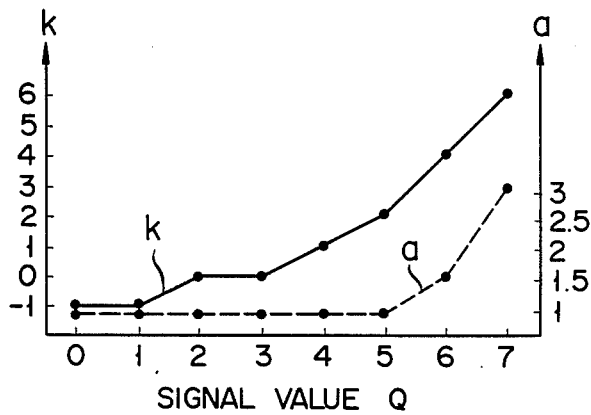
FIG. 47

COLOR IMAGE PROCESSING APPARATUS WITH IMAGE CORRECTOR

BACKGROUND OF THE INVENTION

1. Field of the Invention

The present invention relates to an image information processing apparatus and, more particularly, to an image signal processing apparatus for processing an input image signal obtained by reading an image pattern such as a paper document using a combination of a plurality of image sensors.

2. Description of the Related Art

Recently, a color copying machine or copier is known, wherein a scanning-type proximity image sensing unit for optically scanning a document image is constituted by arranging a plurality of linear image sensors in the main scanning direction. A combination of a plurality of color linear image sensors facilitates the manufacture of a scanning-type linear image sensing unit capable of reading a document image of a larger size. It is difficult for, however, for manufacturers to manufacture a special linear image sensor which has an increased length corresponding to a desired document size, and this results in an increase in cost.

Although the color copying machine with the above arrangement of a plurality of color lineage image sensors has an advantage in the manufacture, uniform brightness and color reproduction characteristics of a color image read signal output from the sensing unit cannot be expected due to a variation in sensitivity among image sensor sub-units, a variation in color characteristics, and the like, even if a document image is scanned using uniform light. In order to match an image read signal from each image sensor sub-unit with those of neighboring image sensor sub-units in view of image characteristics and hence to obtain a high-quality color image free from color ununiformity, a complicated compensating circuit which includes a shading compensator and a color phase compensator is used. Such a color compensating circuit becomes more complex in accordance with an increase in the number of image sensors used, and this renders the entire construction of the copying machine much more complicated. As a result, the manufacturing cost of the copying machine is undesirably increased.

In the color copying machine, along with developments in digital circuit techniques and an increase in capacity and decrease in cost of semiconductor memory devices, a color image is normally processed in a digital manner. The digital image signal is converted to a hard copy by a thermal printer or a laser printer. Since such a printer has a limited density expression capability per pixel (called "tone"); a dither method is used to print a half-tone image such as a picture image. However, in dither processing of an image signal, if an original image includes a screen tone image component, moire noise is inherently generated at that portion, and image quality is considerably degraded. If low-pass processing is performed to eliminate the moire noise, an image resolution density is degraded.

SUMMARY OF THE INVENTION

It is therefore an object of the present invention to provide an improved image processing apparatus.

It is another object of the present invention to provide an improved color image signal processing apparatus which generates a high-quality hard-copy image based on an input image read by optical scanning.

It is still another object of the present invention to provide an improved color image signal processing apparatus which reads an input image using an array of image sensor sub-units and can improve image quality of an image information signal.

In accordance with the above object, the present invention is addressed to a specific image processing apparatus, which has: an image input unit for optically scanning an input original image to generate an image read signal representing the input image; and an image output unit for producing a copy image corresponding to the input image at limited print density levels. A first signal processing section is connected with the image input unit to receive an image read signal. The first signal processing section performs local picture segmentation of the input image based on a pattern matching technique, and generates a pattern matching result signal (segmentation signal) for specifying a type of image in a pixel region of a predetermined size of the input image. A second signal processing section is connected with the image input unit to receive the image read signal, and is also connected to the first signal processing section. The second signal processing section performs different image signal correction processing operations in accordance with the identified type of image of the input image in response to the output signal of the first processing section. The second processing section performs a selected image correction processing operation to generate a corrected image signal. A third signal processing section is connected with the second signal processing section to receive the corrected image signal. The third signal processing section performs multi-value dither processing of the corrected image signal, thereby generating a drive signal for the image output unit. This drive signal defines a printing pixel pattern in units of pixels of the input image.

The present invention and its objects and advantages will become more apparent from the detailed description of the preferred embodiments presented below.

BRIEF DESCRIPTION OF THE DRAWINGS

In the detailed description of a preferred embodiment of the invention presented below, reference is made to the accompanying drawings of which:

FIG. 2 is a view illustrating a relative density in nonlinear conversion processing for converting density information of an image signal into dot area information;

FIG. 3 is a plan view of two neighboring image sensors included in a scanning-type proximity image sensing unit of the embodiment shown in FIG. 1;

FIG. 4 is a plan view showing a color filter pattern of the image sensing unit of the embodiment shown in FIG. 1;

FIG. 5 is a block diagram schematically showing an arrangement of a main portion of a modification of the image reading device shown in FIG. 1;

FIG. 6 is a block diagram schematically showing an arrangement of a main portion of another modification of the image reading device shown in FIG. 1;

FIG. 14 is a diagram showing an internal circuit arrangement of the color phase compensating circuit shown in FIG. 13;

FIG. 15 is a diagram showing a modification of the internal circuit arrangement of the color phase compensating circuit of FIG. 14;

FIG. 17 is a graph showing the relationship between input image signal Si and log-converted signal Si" which are generated in a color conversion processing step in the color converter shown in FIG. 16;

FIG. 18 is a graph showing the relationship between color signal Dj and ink amount signal Tj which are generated in the color conversion processing step of the color converter shown in FIG. 16;

FIG. 19 is a diagram illustrating an arrangement of linear image sensors which constitute an image sensing unit provided to the color converter shown in FIG. 16;

FIG. 20 is a front view of an operation panel provided for the color converter shown in FIG. 16;

FIG. 21 is a graph showing an I/0 characteristic obtained when a combination of a density level and a background ununiformity reduction level on the operation panel shown in FIG. 20 is changed in the conversion processing between color signal Dj and ink amount signal Tj;

FIGS. 22 and 23 are graphs showing two different I/0 characteristics in conversion processing between signals Si and Si";

FIG. 24 is a block diagram showing a partially modified circuit arrangement of the embodiment shown in FIG. 16;

FIG. 25 is a block diagram showing a color image processing apparatus suitable for a color copying machine of the present invention;

FIG. 26 is a block diagram showing an internal arrangement of a color conversion circuit provided to the color image processing apparatus shown in FIG. 25;

FIGS. 37A to 37F are diagrams showing typical Laplacian patterns of a bi-level image component, a screen tone image component and a half-tone image component;

FIG. 38 is a graph showing relative frequencies Hc and Hs of Laplacian patterns of each image component when an input original image consists of bi-level image components and screen tone image components;

FIG. 40 is a diagram showing an internal circuit arrangement of a picture segmentation circuit shown in FIG. 36;

FIG. 41 is a diagram showing a kernel pattern of a digital filter circuit serving as a Laplacian filter shown in FIG. 40;

FIG. 42 is a diagram showing a frequency response characteristic of the digital filter circuit shown in FIG. 40;

FIG. 45 is a diagram showing an internal arrangement of an adative signal processor shown in FIG. 36;

FIGS. 46A and 46B are diagrams showing kernel patterns of first and second filter circuits shown in FIG. 45; and FIG. 47 is a graph showing processing parameters at respective signal levels of a multi-level picture segmentation signal obtained by the picture segmentation circuit shown in FIG. 40.

DETAILED DESCRIPTION OF THE PREFERRED EMBODIMENTS

Figure 1:
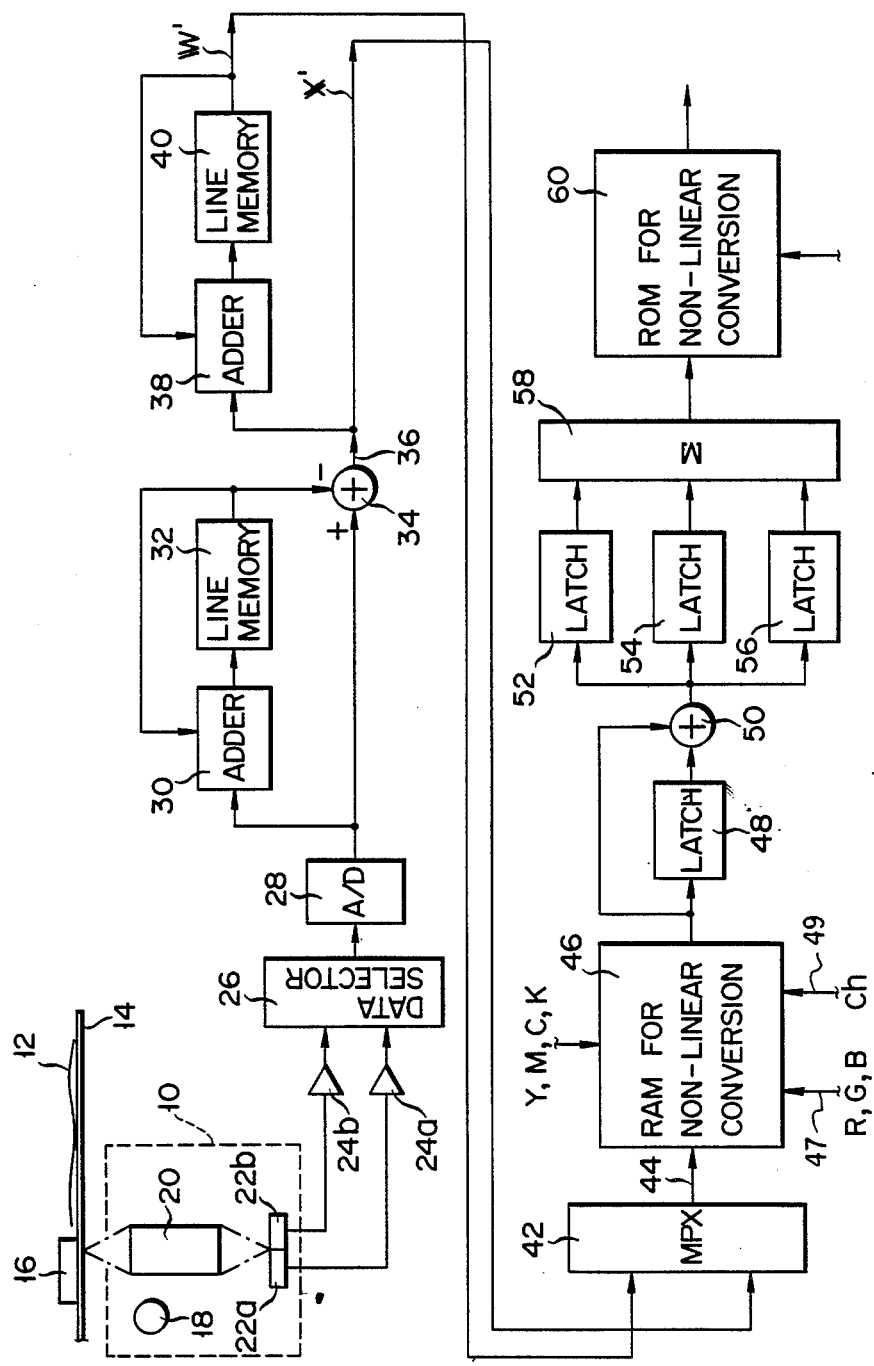
FIG. 1 is a block diagram schematically showing an arrangement of an image reading device of a copying machine as a color image processing apparatus according to a preferred embodiment of the present invention.

A color copying machine or copier as an image information processing apparatus in accordance with a preferred embodiment of the present invention incorporates a color image reading device shown in FIG. 1. Scanning-type proximity sensor unit 10 optically reads an image from a paper document 12 placed on glass document table 14. White reference plate 16 is provided on table 14. Sensor unit 10 has elongated light source 18, self-focusing rod-lens array 20, and image sensing device 22 which is constituted by a linear array of a plurality of chips of imaging devices, e.g., linear CCD image sensors. Light source 18 illuminates document 12. Light reflected by document 12 is focused on linear image sensors 22a, 22b, . . . through rod-lens array 20.

Output signals of image sensors 22a and 22b are supplied to data selector 26 respectively through signal amplifiers 24a and 24b. Data selector 26 is constituted by a switching circuit such as an analog switch circuit, and selects one of the input image readout signals, which is then transferred to analog-to-digital converter (to be referred to as "A/D converter" hereinafter) 28.

Before document 12 is read, sensor unit 10 reads black and white reference signals. The black reference signal is read such that image sensors 22 are operated while light source 18 is deactivated and light incident on sensor unit 10 is shielded. The white reference signal is read such that light emitted from light source 18 and reflected by white reference plate 16 is introduced to image sensors 22.

In the read mode of the black reference signal, an output signal of data selector 26 (i.e., an image readout signal of a selected one of the two linear image sensors) is converted by A/D converter 28 into a digital signal, which is stored, through adder 30, in first line memory ("black reference line memory") 32, the output of which is fed back to adder 30. The digital black reference signal will contain random noise and drift noise components generated by image sensors 22 and amplifiers 24. In order to eliminate these noise components, the black reference signal is read several times, and the read results are averaged. The average signal is stored in line memory 32. In this case, if the number of times of average addition is a power of "2", an average value can be obtained by repeating shift processing. It should be noted that when specific processing is required in view of noise characteristics, the storage content of line memory 32 is read out, and resultant data may be restored in line memory 32 after the processing is completed.

Subsequently, light source 18 is activated, and light reflected by white reference plate 16 is focused on image sensors 22 using lens array 20. The output signals of these image sensor 22 are amplified and converted to digital signals, and are stored in line memory 32 in a similar manner as described above. If the white reference signal is read several times, adverse influence from contamination of the white reference plate 16 and/or noise components can be minimized. The digital white reference signal is subjected to subtraction processing in adder 34 with the above black reference signal, thereby obtaining difference signal 36. When the number of times of addition of the black reference signals to line memory 32 is 16 ($2^4$) times, data supply to adder 34 is performed by adjusting the MSBs by 4-bit shift processing. Difference signal 36, therefore, represents a true white reference signal from which signal components corresponding to the black reference signal have subtracted. True white reference signal 36 is supplied to second line memory ("white reference line memory") 40 through adder 38.

Sensor unit 10 is then moved to optically read paper document 12. The document image read by the linear array of image sensors 22 is amplified by amplifiers 24, and is converted to digital image data by A/D converter 28, thereby obtaining color document read signal $X'$ and white reference signal $W'$ subjected to subtraction with the content of line memory 32. These signals $X'$ and $W'$ are supplied to multiplexer 42, as shown in FIG. 1. Multiplexer 42 combines these signals to produce multiplexed image signal 44. Multiplexed image signal 44 is input to non-linear converter 46 comprising a RAM (Random Access Memory).

RAM 46 receives and stores data for color conversion suitable for an output printer supplied from a CPU (not shown). More specifically, if the output printer is a frame-sequential recording apparatus such as a color thermal printer or a color laser printer, suitable data is set to scan document, 12 when a yellow signal is output. When magenta, cyan, and black (four color printing) signals are output, suitable data is set for every scanning, and scanning is repeated in units of colors. In this case, RAM 46 receives RGB signal 47, the non-linear content of which is switched in accordance with color separation signals R, G, and B of an input signal. When a plurality of line sensors are used as in this embodiment, color separation signals are slightly different from each other among line sensors, and the non-linear conversion data is switched in units of line sensors so as to compensate for the color signals. For this purpose, switching signal (Ch) 49 is also input to RAM 46.

In this embodiment, a logarithmic conversion is employed as a non-linear conversion. Non-linear converter 46 logarithmically converts signals $X'$ and $W'$, and multiplies the converted signals with a constant. In this case, read signal $X'$ of document 12 is first subjected to non-linear conversion, and is stored in latch 48. Subsequently, white reference signal $W'$ is subjected to non-linear conversion, and is transferred to adder 50. Adder 50 serves to subtract the non-linear converted white reference signal $W'$ from the storage content (i.e., non-linear converted read signal $X'$) of latch circuit 48. The output signal from adder 50 represents a document-readout image signal which is standardized (i.e., subjected to shading compensation) based on the white reference signal.

The shading-compensated image signal is stored in one of three latch circuits 52, 54, and 56 in accordance with red, green, and blue color components. The output signals from latch circuits 52, 54, and 56 are supplied to adding circuit 58 to be added to each other. The output signal from adding circuit 58 is supplied to second non-linear converter 60 comprising a ROM, and is compensated thereby to match printing characteristics of a color printing machine or color printer unit (not shown) connected thereto. The output signal of second non-linear converter 60 serves as a signal for controlling color ink amounts of the printer.

The processing contents described above will be described in more detail. Black and white reference signals output from line sensors 22 are respectively given as $B$ and $W$, a color document read signal is given as $X$, and respective color separation components are given by the following relations:

$$\mathbb{B} = \begin{pmatrix} Br \\ Bg \\ Bb \end{pmatrix} \qquad (1)$$

$$\mathbb{W} = \begin{pmatrix} Wr \\ Wg \\ Wb \end{pmatrix}$$

$$\mathbb{X} = \begin{pmatrix} Xr \\ Xg \\ Xb \end{pmatrix}$$

Document read signal $\mathbb{X}_N$ from which black reference signal $\mathbb{B}$ is subtracted and is normalized by white reference signal $\mathbb{W}$ (i.e., subjected to shading compensation) is expressed as follows:

$$\mathbb{X}_N = \frac{\mathbb{X} - \mathbb{B}}{\mathbb{W} - \mathbb{B}} = \frac{\mathbb{X}'}{\mathbb{W}'} \qquad (2)$$

When both the sides are subjected to logarithmic conversion, the following equation can be obtained:

$$\log \mathbb{X}_N = \log(\mathbb{X} - \mathbb{B}) - \log(\mathbb{W} - \mathbb{B}) \qquad (3)$$

If a density signal subjected to masking processing is given as $\mathbb{D}$, $\mathbb{D}$ is represented as follows:

$$\mathbb{D} = A \cdot \log \mathbb{X}_N = \begin{pmatrix} a_{11} & a_{12} & a_{13} \\ a_{21} & a_{22} & a_{23} \\ a_{31} & a_{32} & a_{33} \end{pmatrix} \cdot \log \mathbb{X}_N \qquad (4)$$

Equation (4) can be rewritten in units of color components as follows:

$$\begin{pmatrix} Dy \\ Dm \\ Dc \end{pmatrix} = \qquad (5)$$

$$\begin{pmatrix} a_{11} & a_{12} & a_{13} \\ a_{21} & a_{22} & a_{23} \\ a_{31} & a_{32} & a_{33} \end{pmatrix} \begin{pmatrix} \log(xr - Br) & - & \log(Wr - Br) \\ \log(xg - Bg) & - & \log(Wg - Bg) \\ \log(xb - Bb) & - & \log(Wb - Bb) \end{pmatrix}$$

For example, component Dy is expressed as follows:

$$Dy = a_{11}\log(xr - Br) - a_{11}\log(Wr - Br) + \qquad (6)$$

$$a_{12}\log(xg - bg) - a_{12}\log(Wg - Bg) +$$

$$a_{13}\log(xb - Bb) - a_{13}\log(Wb - Bb)$$

In this manner, input signal $\mathbb{X}$ is subjected to shading compensation in accordance with black and white reference signals B and W, and is then subjected to color compensation (masking processing) by matrix A. As can be seen from equation (6), $\mathbb{B}$ is subtracted from signals $\mathbb{X}$ and $\mathbb{W}$ non-linear conversion $a_{ij}\log$ is then performed, and subtraction and addition can then be performed.

Non-linear processing for converting a color-compensated (masking-processed) signal to one suitable for a color printer will be explained below. A case will be described wherein a density of an ink surface is substantially constant like in a thermal color printer or a laser beam color printer, and is controlled by an ink dot area. Dy in equation (6) is represented as a relative density with respect to a solid yellow ink. If a reflectivity of the solid yellow ink is given as $\rho$, and a reflectivity at that time is given as R, Dy is expressed as follows:

$$Dy = \frac{-\log R}{-\log \rho} \qquad (7)$$

Thus, reflectivity R is expressed as:

$$R = \rho^{Dy} \qquad (8)$$

This value corresponds to reflection when ink having reflectivity $\rho$ has thickness Dy in FIG. 2. In contrast to this, as shown in FIG. 2, reflectivity R obtained when ink having reflectivity $\rho$ is covered with dot area S is given by:

$$R = 1 - S(1 - \rho) \qquad (9)$$

If R in equation (9) is equal to R in equation (8), relative density Dy can be expressed by dot area S.

$$S = \frac{1 - \rho^{Dy}}{1 - \rho} \qquad (10)$$

More specifically, when the above relation is stored in ROM 60 serving as the second non-linear converter, data is converted to dot area S. The image signal can be output to the printer in accordance with this amount. Note that although $\rho$ differs in accordance with spectral characteristics of a color separation filter, good results can be obtained if it is about 0.1. In addition, $\rho$ is preferably changed in accordance with inks (Y, M, C) to perform appropriate conversion. In this case, ROM 60 requires a switching signal. If an A/D converter has an 8-bit arrangement, calculations after RAM 46, serving as the first non-linear converter, to non-linear conversion ROM 60 are preferably performed in about 12 bits to obtain results with high precision. When the output printer has output characteristic approximate to equation (10), non-linear conversion ROM 60 is not required.

A color compensation technique when a plurality of color line sensors are used will now be described. This technique is based on the principle described in Japanese Patent Application Serial No. 60-240,974.

As shown in FIG. 3, two line sensors 22a and 22b are arranged adjacent to each other to read a one-line image. Assume that a color of in right region 62 of line sensor 22 is slightly different from that of in left region 64 of line sensor 22b. In place of document 12, a color test chart of six colors (Y, M, C, R, G, B) shown in FIG. 4 is placed on document table 14, and is read.

A signal of a j ink document obtained when it is read using a reference line sensor is given as $\mathbb{X}_{Oj}$, and a signal subjected to shading compensation of equation (3) is given as $\mathbb{X}_{LNOj}$. In this case, if a reference matrix coefficient is given as $A_O$, reference density signal $\mathbb{D}_{Oj}$ at that time is expressed as follows:

$$\mathbb{D}_{Oj} = A_O \mathbb{X}_{LNOj} \qquad (11)$$

Then, average square error E of reference density signal $\mathbb{D}_{Oj}$ and density signal $(A_1 \mathbb{X}_{LNOj})$ obtained such that signal $\mathbb{X}_{LNOj}$ obtained by reading the j ink by region 62 and subjecting it to compensation of equation (3) is converted by matrix $A_l$ is calculated as follows:

$$\Sigma = \sum_j (w_j | A_1 \mathbf{X}_{LNOj} - \mathbb{D}_{0j} |^2) \quad (12)$$

where $W_j$ is a weighting coefficient for each color, and $$\sum_j$$

represents a sum of colors when j=Y, M, C, R, G, B. Matrix $A_1$ for minimizing error E can be obtained by:

$$A_1 = \left( \sum_j w_j \mathbb{D}_{0j} \mathbf{X}^t_{LN1j} \right) \left( \sum_j \mathbf{X}_{LN1j} \mathbf{X}^t_{LN1j} \right)^{-1}$$

(where t indicates transposition. $^{-1}$ indicates an inverse matrix).

In this manner, a signal of sensor region 62 can be approximated to a reference signal. A signal of sensor region 64 can be similarly approximated to the signal of region 62 in the same manner as described above. More specifically, density signal $\mathbb{D}_{1j}$ of region 62 is calculated based on $A_1$ and $\mathbf{X}_{LN1j}$ obtained by equation (13) in the same manner as in equation (11). Signal $\mathbf{X}_{LN2j}$ of region 62 compensated by equation (3) is then calculated, and $A_2$ is calculated as follows in the same manner as in equation (13):

$$A_2 = \left( \sum_j w_j \mathbb{D}_{0j} \mathbf{X}^t_{LN2j} \right) \left( \sum_j \mathbf{X}_{LN2j} \mathbf{X}^t_{LN2j} \right)^{-1} \quad (14)$$

Non-linear conversion data corresponding to matrices $A_1$ and $A_2$ (corresponding to equation (6)) are switched in accordance with read signals from line sensors 22a and 22b, thereby eliminating a difference between the two line sensors. In this manner, if a color is read by a plurality of line sensors, a color difference among sensors can be eliminated. Output signal $\mathbb{D}_k$ of a black ink output in the case of an output for a four-color printer can be obtained by the following equation in the same manner as in equation (5):

$$\mathbb{D}_k = (k1, k2, k3) \begin{pmatrix} \log(xr - Br) - \log(Wr - Br) \\ \log(xg - Bg) - \log(Wg - Bg) \\ \log(xb - Bb) - \log(Wb - Bb) \end{pmatrix} \quad (15)$$

A second embodiment will be described hereinafter with reference to FIG. 5. FIG. 5 shows only a portion different from the first embodiment of FIG. 1, and other portions are the same as those in the first embodiment of FIG. 1. In this embodiment, two non-linear conversion RAMs 70 and 72 are used to improve processing speed. More specifically, read signal $\mathbf{X}'$ from which a black reference signal is subtracted, and white reference line memory output $\mathbf{W}'$ are respectively input to RAMs 70 and 72, and are linearly converted in the same manner as in the above embodiment. The converted signals are subtracted from each other by adder 74, and the subtraction result is stored in latch circuit 78 through adding circuit 76. The signal is read out from latch circuit 78 in units of color separation signals in the same manner as in the first embodiment, and is subjected to the calculation of equation (5). In this method, adding circuit 76 and latch circuit 78 are simplified as compared to the above embodiment. In the first and second embodiments, RAMs 46, 70, and 72 can be replaced with ROMs, and ink color components of printers can be prestored therein. In this case, a switching signal must be input to the ROMs to output the ink signals.

According to a modification shown in FIG. 6, the conversion function of non-linear conversion RAMs 46, 70, and 72 used in the above embodiments is limited to logarithmic conversion. ROMs 80 and 82 constituting a logarithmic conversion section are arranged to respectively receive document image read signal $\mathbf{X}'$ and white reference signal $\mathbf{W}'$. The output signals from these ROMs are supplied to adder 84, and are subtracted from each other. The subtraction result is supplied to calculation circuit 86 which comprises a RAM to calculate equation (5). The output signal of RAM 86 is stored in latch 92 through sum calculator 90. According to this circuit arrangement, RAM 86 must have a larger capacity than in the above embodiments in order to perform calculations with high precision.

In the above embodiments, variations caused by spectral distribution characteristics of color separation filters, light receiving sensors, and the like are eliminated by a compensating technique. With the existing compensation technique, however, the variations cannot be eliminated without adversely influencing an output image. In particular, sensitivity of man's eye to an output on a recording sheet is very high, and hence, the existing compensation technique is insufficient.

In the following embodiment, there is used a technique for minimizing a variation in read color signals and reducing or removing color ununiformity even if spectral distribution characteristics of color separation filters vary, which will be described below.

The characteristic feature of this embodiment is as follows: in an apparatus for reading a color image using a plurality of image sensors and color separation filters, a light source having a discontinuous light emission spectrum is used in place of a light source having a continuous light emission spectrum. In addition, when a plurality of array elements (CCD color sensors) each consisting of a plurality of image sensors are used, a coefficient of a matrix circuit is changed for each array element to perform compensation. Of wavelengths of a 3-wavelength light source, a transmittance in two wavelength ranges excluding a main transmission wavelength is sufficiently low.

In this embodiment, since a discontinuous 3-wavelength type light source is used, an unstable portion with variations of he spectral distribution of a color separation filter is not used but a relatively stable portion is selectively used. Thus, if the entire spectral distribution of the color separation filters varies, relatively stable color signals can be obtained. The spectral distribution of the three wavelengths is appropriately determined to improve color separation characteristics. When a plurality of image sensor array elements are used, a coefficient of a matrix circuit is changed for each array element to perform compensation, so that color ununiformity can be compensated to a level that cannot be visually detected. Since color separation filters which have sufficiently low transmittance in two wavelength ranges excluding a main transmission wavelength of the 3-wavelength light source are used, a variation in spectral distribution of a color separation system can be equivalent to a sensitivity variation (brightness variation). Thus, a color read signal is divided by a signal obtained by reading a white reference plate (corresponding to shading compensation), thereby compensating for the variation, and eliminating color ununiformity.

Figure 7:
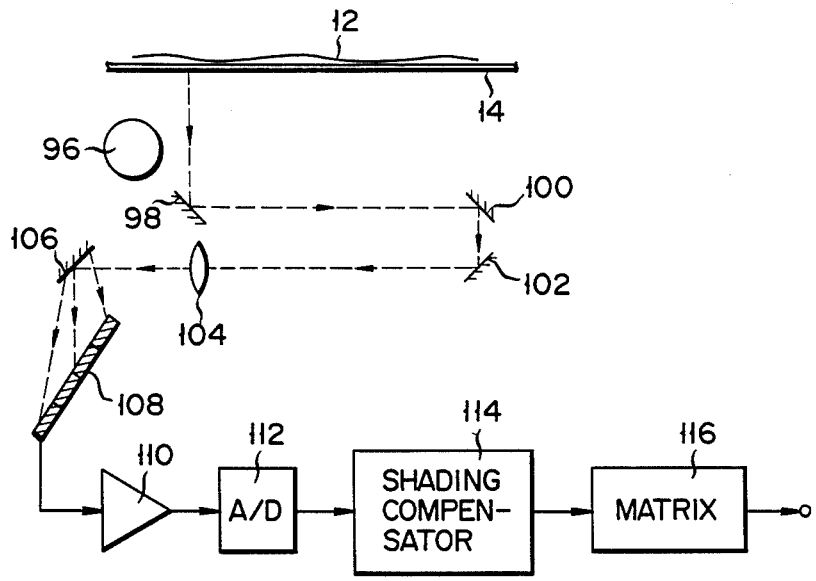
FIG. 7 is a block diagram showing a circuit arrangement for performing shading compensation of an output signal from the image sensing unit.
Figure 8:
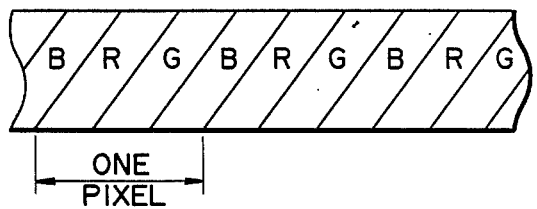
FIG. 8 is a diagram showing a two-dimensional pattern of a color filter provided to each image sensor element.

FIG. 7 shows a circuit arrangement for embodying the above technique of color compensation. Elongated light source 96 comprises a 3-wavelength type light source which has discontinuous spectral distribution characteristics. Light emitted from light source 96 and reflected by paper document 12 is guided to linear image sensor unit 108 through an optical path constituted by mirrors 98, 100, and 102, lens 104, and mirror 106, and is then focused thereonto. Image sensor unit 108 has four color CCD image sensor chips, as shown in FIG. 7. Each color linear image sensor has a color filter in which R, G, and B color filter elements are sequentially arranged, as shown in FIG. 8. The output signals of image sensor unit 108, i.e., image read signals, are supplied through amplifier 110 and A/D converter 112 to shading compensator 114, which standardizes (normalizes) a document image readout signal using a black reference signal and a white reference signal obtained by optically reading a white reference plate (see FIG. 1), thereby compensating for sensitivity non-uniformity among sensors of sensor unit 108 and illumination non-uniformity of light source 98, as disclosed in Japanese Patent Application No. 59-192663. In order to eliminate a color non-uniformity variation among linear image sensors of unit 108, a matrix compensating circuit, disclosed in, e.g., Japanese Patent Application No. 60-240,974, is used to optimize a coefficient of a matrix for each sensor element.

A case will be described below wherein the color non-uniformity can be eliminated using the 3-wavelength type light source having a discontinuous spectral distribution, and the color non-uniformity can be removed by combining color filters.

Figure 9:
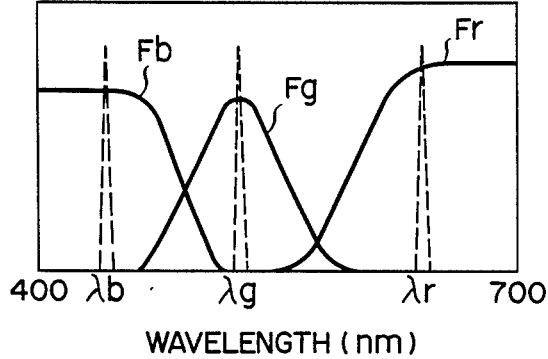
FIG. 9 is a graph showing discontinuous spectral distribution characteristics of light source light used when a document image is optically scanned.

In the graph of FIG. 9, a solid curve represents spectral distribution characteristics (including spectral sensitivity of a sensor) of color separation filters $Fr(\lambda)$, $Fg(\lambda)$, and $Fb(\lambda)$ which are arranged on color light receiving sensor 108. A broken curve in FIG. 9 represents spectral distribution $L(\lambda)$ of 3-wavelength type light source 96. Assuming that color document $Ij(\lambda)$ is input to sensor 108, sensor output Oij is expressed as follows:

$$Oij = \int L(\lambda)Fi(\lambda)d\lambda \quad (16)$$

Since the reflection spectral characteristics of the white reference plate are substantially 1, output Oiw obtained by reading the white reference plate is expressed as:

$$Oiw = \int L(\lambda)Fi(\lambda)d\lambda \quad (17)$$

Therefore, if the light emission spectra of the 3-wavelength type light source are respectively given as linear spectra $\lambda r$, $\lambda g$, and $\lambda b$, and a light emission intensity thereof is set to be 1, signal Xri of an r sensor normalized by the white reference signal is given by:

$$\begin{aligned}
Xri &= \frac{Ori}{Orw} = \frac{Fr(\lambda r)Ij(\lambda r) + Fr(\lambda g)Ij(\lambda g) + Fr(\lambda b)Ij(\lambda b)}{Fr(\lambda r) + Fr(\lambda g) + Fr(\lambda b)} \\
&= \frac{Ij(\lambda r)}{1 + \frac{Fr(\lambda g)}{Fr(\lambda r)} + \frac{Fr(\lambda b)}{Fr(\lambda r)}} \\
&+ \frac{\frac{Fr(\lambda g)}{Fr(\lambda r)}Ij(\lambda g) + \frac{Fr(\lambda b)}{Fr(\lambda r)}Ij(\lambda b)}{1 + \frac{Fr(\lambda g)}{Fr(\lambda r)} + \frac{Fr(\lambda b)}{Fr(\lambda r)}}
\end{aligned} \quad (18)$$

If $Fr(\lambda g)/Fr(\lambda r)$ and $Fr(\lambda b)/Fr(\lambda r)$ are sufficiently smaller than 1 and can be ignored, equation (18) can be rewritten as follows:

$$Xrj \approx Ij(\lambda r) \quad (19)$$

As can be understood from equation (19), the sensor signal is not affected by color separation filters (including spectral sensitivity of the sensor).

More specifically, when the spectral characteristics of color separation filters have sufficiently low transmittance in two wavelength ranges (e.g., $\lambda g$ and $\lambda b$) excluding a main transmission wavelength (e.g., $\lambda r$) in spectra of three wavelengths, color non-uniformity can be removed. In this case, the color variation among color light receiving elements (e.g., color CCD sensors) and the color non-uniformity in color light receiving elements can also be removed. For this reason, matrix circuit 116 shown in FIG. 7 may be omitted. In the above description, the linear light emission spectra are assumed for the sake of simplicity. However, the present invention is not limited to the linear light emission spectra. In this case, a transmittance in the other two wavelength ranges excluding the main transmission wavelength must be sufficiently decreased. The light emission intensity is not limited to 1, either. However, when the white reference plate is read, the color separation output signals are preferably substantially equal to each other.

In equation (18), when $Fr(\lambda g)/Fr(\lambda r)$ and $Fr(\lambda b)/Fr(\lambda r)$ cannot be ignored with respect to 1, color separation signal Xrj is influenced by the color separation filter. However, as shown in FIG. 9, if light emission spectra are set in a relatively small variation portion of the spectral distribution, color non-uniformity caused by the color separation filter can be eliminated. In this case, since the color non-uniformity is large among the color light receiving elements (chips), a matrix circuit 11b shown in FIG. 7 is necessary. However, if central wavelengths $\lambda r$, $\lambda g$, and $\lambda b$ of light emission spectra of the three wavelengths are respectively selected near 610, 530 to 540, and 450 to 460 (nm), the color non-uniformity among the light receiving element chips can be minimized by the matrix compensating circuit. In this case, color non-uniformity cannot be visually observed.

According to the present invention as described above, the shading compensation for compensating for noise components caused by sensitivity variations of light receiving sensors, the illumination non-uniformity, the matrix compensation for performing color compensation among a plurality of image sensors, and masking processing for performing color compensation for obtaining outputs to a color printer, are achieved not by individual circuit elements but by non-linear conversion and addition/subtraction. Therefore, complicated circuits such as multipliers need not be used, and a circuit arrangement can be greatly simplified. Since non-linear conversion can be achieved by almost one-dimensional conversion, precise calculation can be performed by a small-capacity memory, thus allowing fine color compensation and color reproduction with high fidelity.

Figure 10:
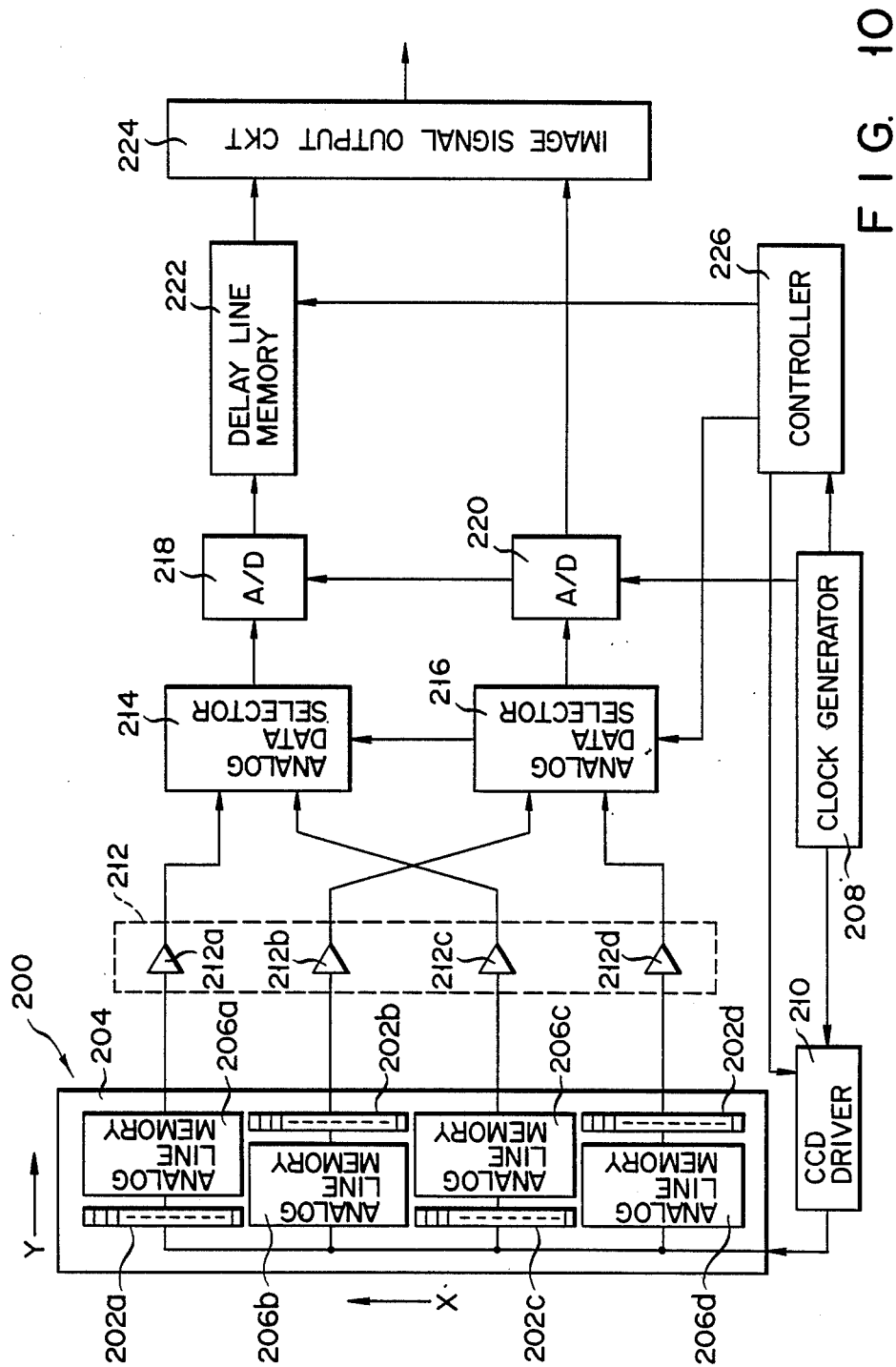
FIG. 10 is a block diagram schematically showing an arrangement of another embodiment of an image reading device applied to the color copying machine of the present invention.

An image reading device shown in FIG. 10 can be applied to the color copying machine of the present invention, wherein proximity color image sensing unit 200 has a plurality of chips of color linear CCD image sensors 202a, 202b, 202c, and 202d, which are zig-zag arrayed along main scanning direction X on mother plate 204.

In this embodiment, each image sensor chip 202 has an array of 1,024 photosensing elements or pixels, each of which has a size of 62.5 $\mu$m $\times$ 62.5 $\mu$m. Image sensing unit 200 can read an image on a B5-sized paper document at a resolution of 16 dots/mm. Image sensors 202 are associated with analog line memories 206a, 206b, 206c, and 206d, respectively. As shown in FIG. 10, adjacent sensor sub-units of image sensors 202 and analog line memories 206 have reversed arrangements, thereby preventing generation of nonphotosensitive cell regions in the sensor sub-units along main scanning direction X. Analog line memories 206 are provided to compensate for a read delay time in sub-scanning direction Y.

Each image sensor 202 of linear image sensing unit 200 receives a clock signal generated by clock generator 208 through CCD driver circuit 210. Linear image sensing unit 200 is connected to amplifier circuit 212. Amplifier circuit 212 includes amplifiers 212a, 212b, 212c, and 212d, which are respectively connected to the outputs of image sensors 202a, 202b, 202c, and 202d of unit 200. Amplifier circuit 212 is connected to analog data selectors 214 and 216 in such a manner that two amplifiers 212a and 212c are connected to selector 214, whereas the remaining two amplifiers 212b and 212d are connected to selector 216. Image read signals are subjected to delay compensation by analog line memories 206, and are then supplied to data selectors 214 and 216. Data selectors 214 and 216 each select one of the CCD output signals (document image read signals) input from image sensing unit 200, which is sequentially supplied to 8-bit A/D converters 218 and 220. A/D converters 218 and 220 perform analog-to-digital conversion in synchronism with the clock signal from clock generator 208.

One of A/D converters 218 and 220, e.g., converter 218, is connected to image signal output circuit 224 through digital delay line memory 222. The remaining one of A/D converters 218 and 220, e.g., converter 220, is connected directly to image signal output circuit 224. Delay line memory 222 can perform 2,048-byte data delay compensation under the control of controller 226, as required.

Circuit 224 receives delay-compensated digital image signals, and arranges these input signals to generate one line of time-sequential image signals along main scanning direction X as a color video output signal. Controller 226 serves to control the overall image processing described above. In particular, when delay compensation is executed in line memory 222, controller 226 sets an appropriate number of lines in analog line memories 202 included in image sensing unit 200, and additionally provides digital delay line memory 222 with the required number of lines to be compensated.

Figure 11:
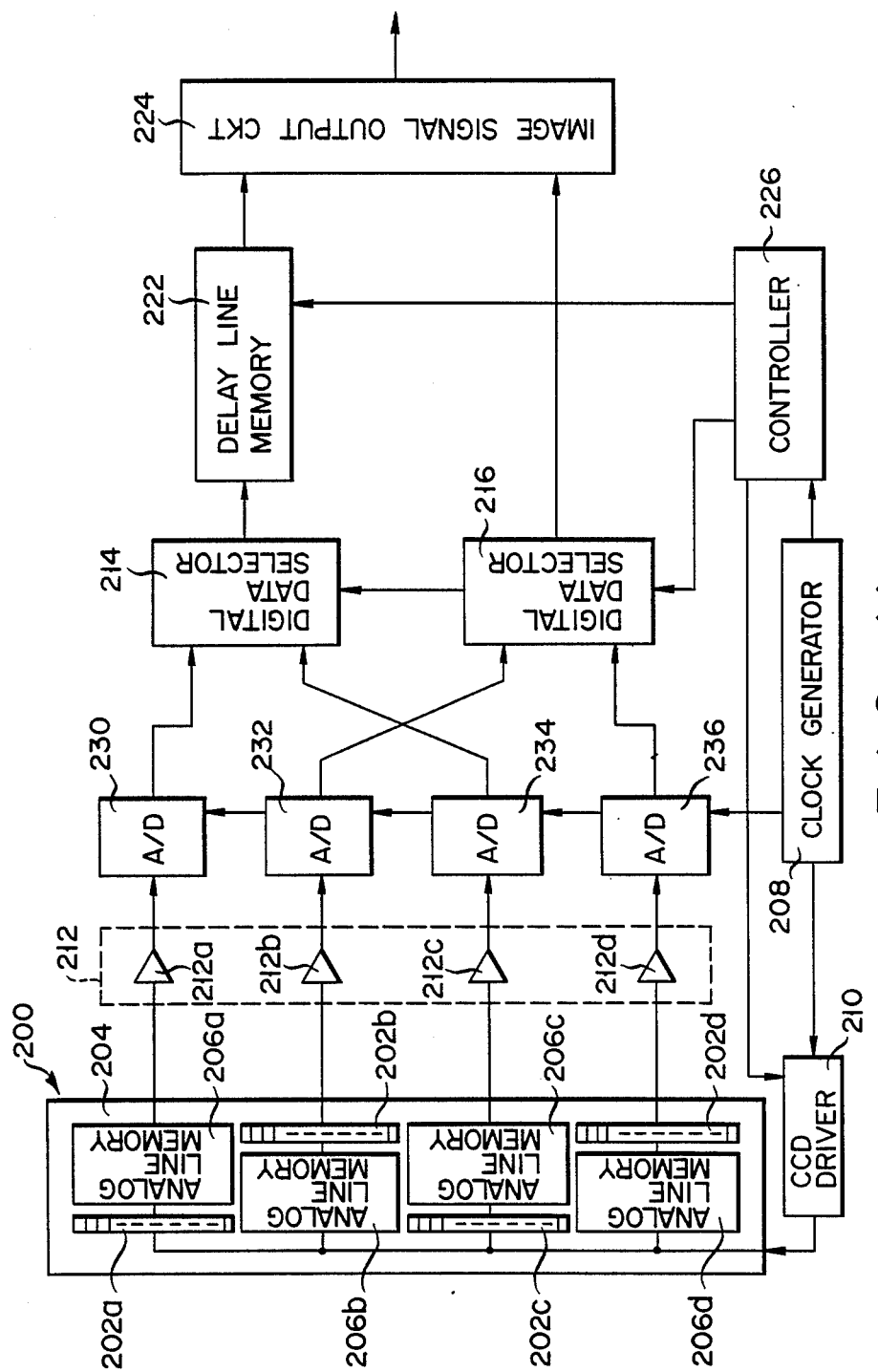
FIGS. 11 and 12 are block diagrams respectively showing arrangements of modifications of the image reading device of FIG. 10.
Figure 12:
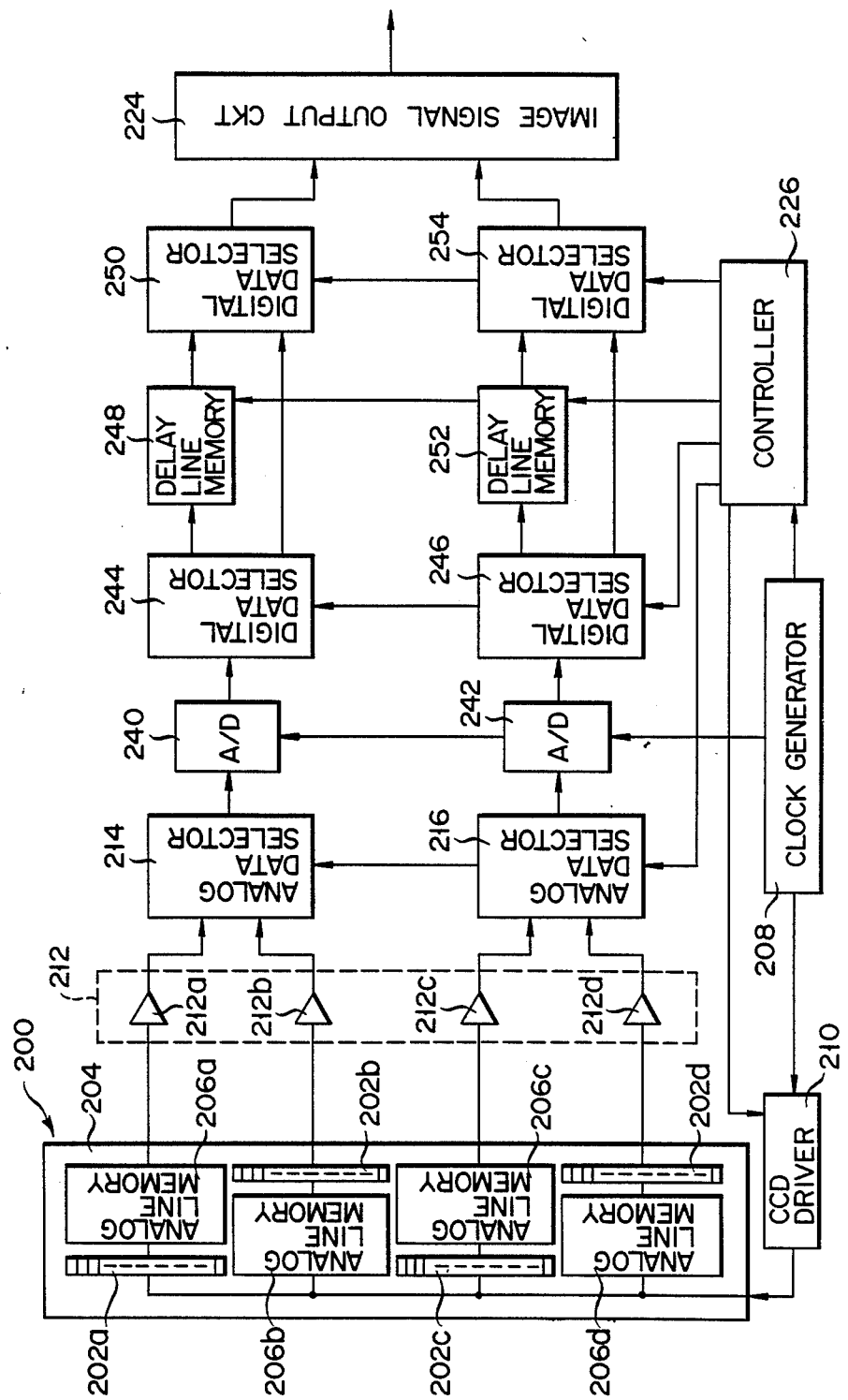

FIGS. 11 and 12 show modifications of the circuit arrangement of FIG. 10, wherein the same reference numerals denote the same parts as in FIG. 10, and a detailed description thereof will be omitted.

A modification circuit of FIG. 11 is different from the embodiment of FIG. 10 in that A/D converters 230, 232, 234, and 236 corresponding to the number of CCD image sensors 202 of linear image sensing unit 200 are provided between amplifier circuit 212 and data selectors 214 and 216. More specifically, a CCD output signal of each image sensor sub-unit 206 is supplied to the A/D converter associated therewith through the corresponding one of the amplifiers.

The circuit arrangement shown in FIG. 12 is suitable for a system in which image read signals requiring delay compensation and ones requiring no delay compensation are not separately processed. With this circuit arrangement, two neighboring amplifiers 212a and 212b of amplifier circuit 212 are connected to A/D converter 240, whereas the remaining two neighboring amplifiers 212c and 212d are connected to A/D converter 242. A/D converters 240 and 242 are respectively connected to digital data selectors 244 and 246. Digital data selector 244 has a first output connected to a first input of digital data selector 250 through delay line memory 248, and a second output directly connected to a second input of selector 250. Similarly, selector 246 has a first output connected to a first input of digital data selector 254 through delay line memory 252, and a second output directly connected to a second input of selector 254. The outputs of selectors 250 and 254 are connected to image signal output circuit 224.

According to the color image reading devices with the above arrangements read delay components, which are generated in sub-scanning direction Y among linear CCD image sensors 202a, 202b, 202c, and 202d zig-zag arrayed along main scanning direction X, can be effectively compensated at high speed by delay line memory 222 or delay line memories 248 and 252 separately provided from image sensing unit 200. A required memory capacity (which defines the number of lines to be compensated) of linear image sensing unit 200 is determined on the basis of a variable range of a sampling pitch in sub scanning direction Y, and a delay amount of zig-zag arrayed linear image sensors 202 in sub-scanning direction Y. According to the present invention, even if the memory capacity of analog line memories 206 incorporated in unit 200 is small and does not meet the required number of lines to be compensated, delay line memory 222 or delay line memories 248 and 252 which are externally arranged to unit 200 can meet the remaining capacity. Therefore, a magnification changing range of an image expansion/reduction function of image sensing unit 200 can be widened.

Figure 13:
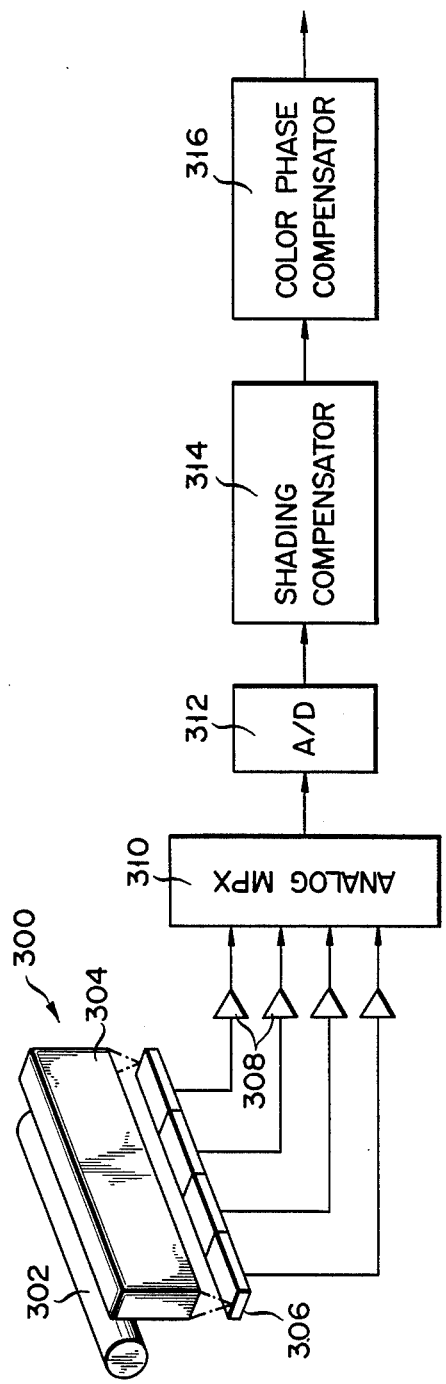
FIG. 13 is a block diagram schematically showing an arrangement of a color phase compensating circuit applied to the color copying machine of the present invention.

A color phase compensating device shown in FIG. 13 can be applied to the color copying machine of the present invention: this color phase compensating device separates a compensation matrix into a unit matrix and a difference component matrix having a relatively small absolute value of each component, and performs a multiplication of the difference component matrix separately from the calculation of the unit matrix.

As shown in FIG. 13, a proximity sensor scanner unit, which is generally designated by reference numeral "300", has elongated light source 302, self-focusing rod-lens array 304, and linear image sensing unit 306 which is constituted by a linear array of a plurality of chips of color CCD image sensors. The CCD output signals of these image sensors of image sensing unit 306 are time-sequentially read out. These image sensor outputs are supplied through amplifiers 308 to analog multiplexer circuit 310. Analog multiplexer 310 multiplexes and combines the CCD output signals, each pixel signal of which includes R, G, and B color components, from the image sensors of image sensing unit 306, thereby producing one image read signal, which is then supplied to A/D converter 312 to be converted to a digital signal.

The digital image output signal of A/D converter 312 is supplied to shading compensator 314, which performs shading compensation so as to compensate for variations in brightness components included in the digital image signal, which inevitably occur due to brightness ununiformity of a document surface, sensitivity variations of color image sensors 306 and variations in color characteristics of color filters, even if a document is scanned using a uniform light source. As described above, shading compensator 314 includes a line memory, which stores predetermined white and black reference signal data before a document is scanned. When a document image is read optically, the black reference signal is subtracted from a read image signal, and the subtraction result signal is divided by the corresponding white reference signal. A basic circuit arrangement therefor is disclosed in detail in Japanese Patent Application Serial No. 59-192,663.

Shading compensator 314 compensates for illuminance ununiformity, sensitivity variation of each light receiving element and offset components. White balance compensation is performed at the same time. When a document is achromatic, compensated RGB signals are thus equal to each other. In particular, when a document image color is reference white or black, compensated RGB signals are 1 or 0.

Shading compensator 314 can compensate for brightness components but cannot always compensate for a variation in color phase components. The variation in color phase components is mainly caused by a variation in color characteristics of the color filters, and hence, the variation occurs in units of sensor chips.

The variation in color phase components is compensated by color phase compensator 316, which is connected to the output of compensator 314. More specifically, color phase compensation is performed such that RGB signals are multiplied with a compensation matrix corresponding to color characteristics of each sensor chip. When RGB signals of each pixel are given by R, G, and B, compensated RGB signals (R', G', and B') are obtained by the following calculation:

$$\begin{pmatrix} R' \\ G' \\ B' \end{pmatrix} = Mn \begin{pmatrix} R \\ G \\ B \end{pmatrix} \quad (20)$$

where Mn is a color phase compensation matrix for sensor chip n.

The operation principle of color phase compensator 316 according to the present invention will be described below. Color phase compensation can be performed by multiplying color image signals R, G, and B with compensation matrix Mn in the same manner as in the aforementioned embodiments. A variation in color characteristics is not large, and compensation matrix Mn is approximate to unit matrix (1). Therefore, compensation matrix Mn can be expressed by:

$$Mn = I + \Delta^n \quad (|\text{ each component of } \Delta^n| << 1)$$

The absolute value of each component of compensation difference matrix $\Delta^n$ is sufficiently smaller than 1.

Compensation matrix Mn normally satisfies the white balance condition: RGB signals when "white" is input are compensated to be 1 by shading compensator 314. Therefore, a specific matrix which is not changed with respect to white signals (R, G, B)=(1, 1, 1), i.e., one satisfying the following equation, is selected as compensation matrix Mn:

$$\begin{pmatrix} 1 \\ 1 \\ 1 \end{pmatrix} = Mn \begin{pmatrix} 1 \\ 1 \\ 1 \end{pmatrix}$$

Difference component matrix $\Delta$ then satisfies the following relation:

$$\begin{pmatrix} 0 \\ 0 \\ 0 \end{pmatrix} = \Delta^n \begin{pmatrix} 1 \\ 1 \\ 1 \end{pmatrix}$$

$$\therefore \sum_j \Delta_{ij}^n = 0 \quad (\Delta_{ij}^n \text{ is an } ij \text{ component of } \Delta^n)$$

Therefore, the equation of matrix compensation can be expressed as follows:

$$\begin{pmatrix} R' \\ G' \\ B' \end{pmatrix} = \begin{pmatrix} R \\ G \\ B \end{pmatrix} + \Delta^n \begin{pmatrix} R \\ G \\ B \end{pmatrix} \quad (21)$$

$$= \begin{pmatrix} R \\ G \\ B \end{pmatrix} + \begin{pmatrix} \Delta_{11}^n - \Delta_{13}^n \\ \Delta_{21}^n - \Delta_{23}^n \\ \Delta_{31}^n - \Delta_{33}^n \end{pmatrix} \begin{pmatrix} R - G \\ G - B \end{pmatrix}$$

Since the absolute value of $\Delta_{ij}^n$ is sufficiently smaller than 1, the calculation precision in the second term of this equation can be low. Color phase compensator 316 according to the present invention performs color phase compensation in accordance with equation (21).

FIG. 14 shows the internal circuit arrangement of color phase compensator 316 of this embodiment. Upon reception of shading-compensated color image signal including R, G, and B components, color difference calculator 320 calculates color difference signals U=R−G and V=G−B. Calculator 320 may be constituted by adders and inverters. Color difference signals U and V output onto signal line 322 are supplied to matrix circuit 326 through register 324. Matrix circuit 326 calculates compensation difference RGB signal ($\Delta R$, $\Delta G$, $\Delta B$) in accordance with the following equation:

$$\begin{pmatrix} \Delta R \\ \Delta G \\ \Delta B \end{pmatrix} = \begin{pmatrix} \Delta_{11}^n & \Delta_{13}^n \\ \Delta_{21}^n & \Delta_{23}^n \\ \Delta_{31}^n & \Delta_{33}^n \end{pmatrix} \begin{pmatrix} U \\ V \end{pmatrix} \quad (22)$$

Although this calculation can be achieved by a combination of multipliers and adders, in matrix circuit 326 of this embodiment, a table look-up technique is employed. In this table, input signals U and V, chip selection signal 328, and ΔR, ΔG, and ΔB selection signal 330, are used as an input address, and compensation difference RGB signals ΔR, ΔG, and ΔB serve as output data.

Chip selection signal 328 is a signal indicating a chip sensor by which color image signal 318 is being currently generated. RGB selection signal 330 is a signal which controls not to perform addition with corresponding RGB components when the compensation difference RGB signal (the output signal of this table) is subjected to addition in adder 334. The output signal of matrix circuit 326 is supplied to adder 334 a compensation difference RGB signal (ΔR, ΔG, ΔB) 332. Original RGB signal 318 is supplied to adder 334 through register 336. Adder 334 adds input signals 332 and 318 to obtain signal 338 representing compensated RGB signal (R', G', B'). The signal transmission timing between registers 324 and 336 is synchronized so that a calculation is performed between signals of identical pixels.

Thus, compensated RGB signal 338 is equivalent to the execution result of compensation calculation (equation (20), and color phase ununiformity among chips can be compensated.

As described above, the absolute value of each component of matrix $\Delta_{ij}^n$ is sufficiently smaller than 1. For example, if each component is smaller than 1/16 ($|\Delta_{ij}^n| < 1/16$), the precision of the matrix calculation can be decreased to 5 bits including a code in order to obtain the signal precision of 8 bits. Therefore, the size of the table corresponds to "$2^5 \times 2^5 \times$ the number of sensor chips $\times 3$". If the depth of the table output is given as 5 bits, the table size corresponds to 60 kilobits, which is a compact arrangement.

The circuit arrangement of color phase compensator 216 may be modified as shown in FIG. 15.

In the above embodiment of FIG. 14, compensation matrix Mn is restricted such that a signal subjected to color phase compensation can satisfy the white balance condition, i.e., when a reference white image is read, a color phase-compensated RGB signal can yield (R, G, B)=(1, 1, 1). However, in some cases, other color signals often need to be adjusted at the cost of white balance. In such a case, optimal compensation matrix Mn does not always satisfy:

$$\begin{pmatrix} 1 \\ 1 \\ 1 \end{pmatrix} = Mn \begin{pmatrix} 1 \\ 1 \\ 1 \end{pmatrix} \qquad (23)$$

The color phase compensator shown in FIG. 14 cannot realize such matrix compensation. In this embodiment of FIG. 15, color phase compensation which does not satisfy the white balance condition can also be realized.

Based on shading-compensated RGB signal (R, G, B) 318, compensation difference RGB signal (ΔR, ΔG, ΔB) 342 is calculated by matrix circuit 340 in accordance with the following equation:

$$\begin{pmatrix} \Delta R \\ \Delta G \\ \Delta B \end{pmatrix} = \Delta^u \begin{pmatrix} R \\ G \\ B \end{pmatrix} \qquad (24)$$

where $\Delta^u$ is a matrix obtained by subtracting unit matrix (I) from compensation matrix Mn as in the above embodiment of FIG. 14.

More specifically, this circuit is constituted by a lookup table. In this table, input RGB signal 318, chip selection signal 328, and selection signal 344 for designating one of ΔR, ΔG or ΔB are used as an input address, and compensation difference signals ΔR, ΔG, and ΔB serve as output data. The size of this table is larger than that of the circuit of FIG. 14 since the number of input signals is increased.

Compensation difference signals ΔR, ΔG, and ΔB output from the matrix circuit are added by adder 334 to original RGB signal 318, to obtain compensated RGB signal (R', G', B') 346. The signal transmission timing between registers 324 and 336 is synchronized so that a calculation is performed between signals of identical pixels in the same manner as in the embodiment of FIG. 14.

Compensated RGB signal 346 thus corresponds to the execution result of the compensation calculation defined by equation (20) described above, and hence, color phase ununiformity among chips can be compensated effectively.

In the above embodiments, an RGB filter such as a primary color filter is used as a color filter for each color sensor. However, the present invention may be also applied to other known color systems including a system employing CG and filters.

In the embodiments shown in FIGS. 13 and 14, the color difference signals used are U=R−G and V=G−B. However, the present invention is not limited to this. The color difference signals may have any definition if the color difference signals become 0 when an input signal represents an achromatic color, i.e., when three color signals are equal to each other.

According to the color phase compensator of the present invention, a compensation matrix is separated into a unit matrix and a compensation difference matrix in which an absolute value of each component is small, and a color signal is multiplied with only the compensation difference matrix. Thus, a low-precision multiplier can be adopted, and circuit cost can be reduced.

Figure 16:
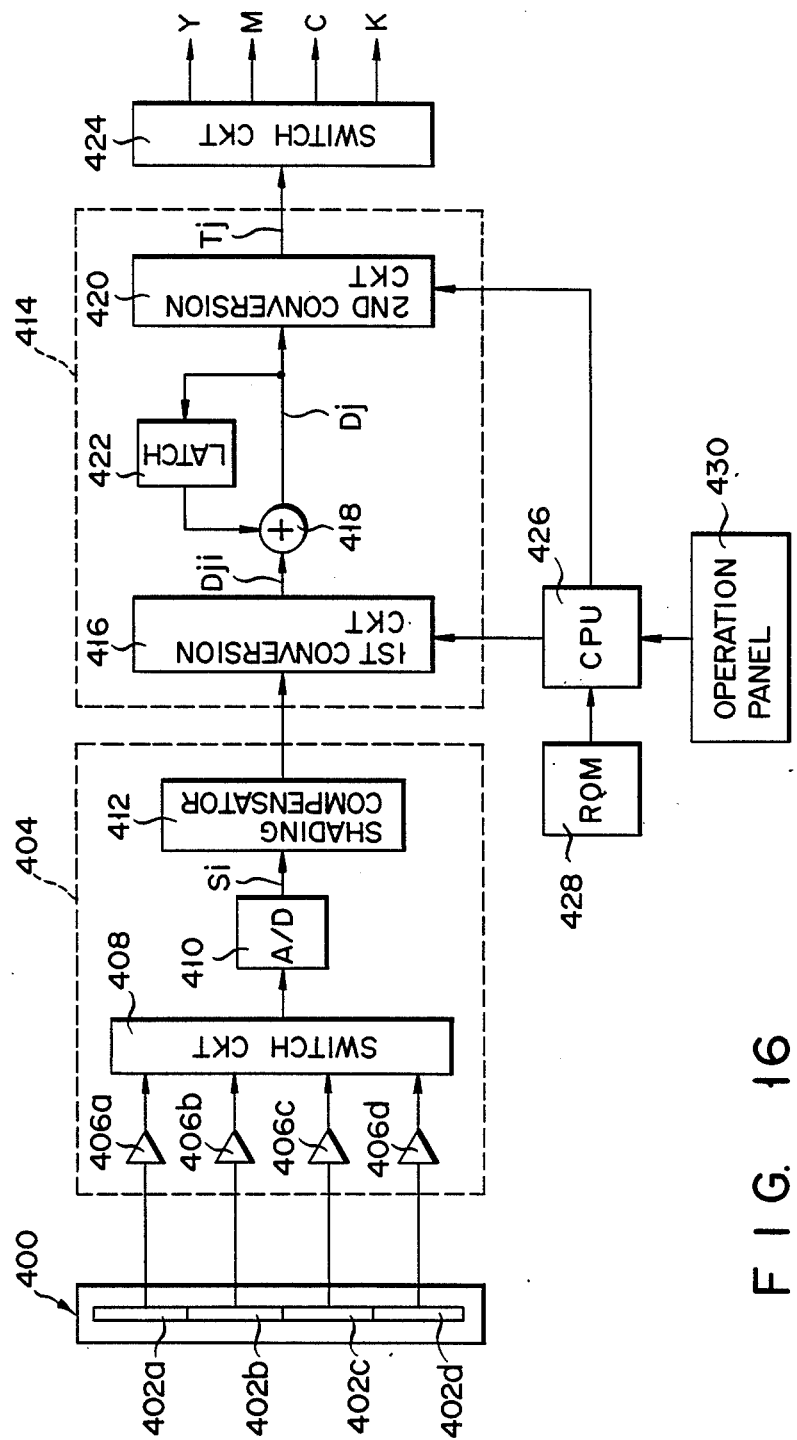
FIG. 16 is a block diagram showing a color converter suitable for a color copying machine of the present invention.

Referring now to FIG. 16, a color converter suitable for a color copying machine of the present invention is illustrated. In FIG. 16, scanning-type linear image sensing unit 400 has, e.g., four linear CCD image sensors 402a, 402b, 402c, and 402d, which are arrayed linearly or in a zig-zag manner along the main scanning direction of unit 400. CCD output signals (document image read signals) of these image sensors are supplied to pre-processing circuit 404.

Pre-processor 404 includes amplifiers 406a, 406b, 406c, and 406d for respectively receiving and amplifying the CCD outputs. The output signals of the amplifiers are sequentially selected by switch circuit 408, and the selected signals are supplied to A/D converter 410 in a serial transfer manner. Digital color image signal Si obtained by A/D converter 410 includes R, G, and B components of a color separation filter (not shown in FIG. 16) used in each image sensor 402. Digital color image signal Si is supplied to shading compensating circuit 412, and is subjected to shading compensation processing (i.e., compensation processing of sensitivity ununiformity of image sensors 402, intensity ununiformity of document scanning light, and the like). The output signal of circuit 412 is normalized such that a signal level corresponding to a white region of a paper document (not shown in FIG. 16) is at logic "1" level, and a signal level corresponding to a black region of the paper document is at logic "0" level. The output signal of pre-processor 404 is generated in such a manner that R, G, and B signal components are generated in a time-sequential order, and these signals are supplied to color conversion circuit 414 of the present invention.

Color conversion circuit 414 is a circuit for performing color conversion processing for optimizing hue and density of an input digital image signal to match with printing of a color hard copy using different color systems, such as yellow (Y), magenta (M), and cyan (C) inks, and further black (K) inks, if necessary, in a color printer (not shown), which comprises a known thermal transfer printer or laser printer) connected thereto. When one of hue or density of an input image signal is to be adjusted, color conversion circuit 414 performs "two-step color adjustment processing" so as to prevent a problem in which the other parameter is changed and accurate adjustment of both the parameters cannot be performed.

In color conversion circuit 414, first color conversion circuit 416 is connected through adder 418 to second color conversion circuit 420. The output of adder 418 is fed back to the second input of adder 418 through latch circuit 422. Second color conversion circuit 420 produces frame-sequential ink amount signals Tj for designating amounts of Y, M, and C inks in printing a color hard copy by the printer (not shown). The output signal of second color conversion circuit 420 is supplied to switch circuit 424. First and second color conversion circuits 416 and 420 are connected to CPU 426. CPU 426 is connected to a table look-up memory such as RAM 428 and operation panel 430.

A technique for calculating amounts of printing inks Y, M, and C will be described below. Image signal Si input to color conversion circuit 414 is converted to intermediate color signal Dij as a third-system color signal. Note that the suffix "j" designates colors Y, M, and C as first-system color signals (j=Y, M, C). Conversion processing of Si to Dij by first conversion circuit 416 is defined by:

$$Dij = Mij \cdot Si'' \qquad (25)$$
$$= Mij \cdot \log\{Si(1-\rho) + \rho\}/\log\rho$$

where Mij: 3×3 matrix coefficient $0 < \rho < 1$

FIG. 17 illustrates the relationship between parameters Si and Si'' in equation (25). Function $\log\{Si(1-\rho)+\rho\}/\log\rho$ in equation (25) can be obtained such that store data in table look-up memory 428 is read out in response to the operation of operation panel 430 by an operator under the control of CPU 426.

Color conversion signals Dij output from first conversion circuit 416 include three color signal components DjR, DjG, and DjB, which are time-sequentially supplied to adder 418. Adder 418 sequentially adds signal components DjR, DjG, and DjB, and a sum signal is latched and stored in latch circuit 422, thereby obtaining color signal Dj. Color signal Dj is therefore represented by the following equation:

$$Dj = DjR + DjG + DjB \qquad (26)$$

According to equation (26), yellow signal DY can be obtained by "DYR+DYG+DYB", magenta signal DM can be obtained by "DMR+DMG+DMB", and cyan signal DC can be obtained by "DCR+DCG+DCB". These color signals Dj (hue-compensated signals) are then supplied to second conversion circuit 420.

Second conversion circuit 420 converts input signal Dj into ink amount designation signal Tj in accordance with an equation defined as follows:

$$Tj = (1-\rho^{Dj})/(1-\rho) \qquad (27)$$

FIG. 18 shows the relationship between parameters Dj and Tj in equation (27). Function $(1-\rho^{Dj})/(1-\rho)$ in equation (27) can also be obtained such that storage data of table look-up memory 428 is read out in response to the operation of operation panel 430 by an operator under the control of CPU 426. It should be noted that ink amount designation signal Tj is output in such a manner that Y, M, C, and K ink components are time-sequentially generated. Ink color component signals are separated by switch circuit 424, and are supplied to a printer unit (not shown).

The above-mentioned color conversion processing is based on the principle of a well-known "masking equation" described below. The following "masking equation" presented below is established between R, G, and B components of a read color (i.e., corresponding to signals Si), and Y, M, and C ink densities DY, DM, and DC for reproducing the colors upon printing:

$$\begin{pmatrix} DY \\ DM \\ DC \end{pmatrix} = -M \begin{pmatrix} \log R \\ \log G \\ \log B \end{pmatrix} \qquad (28)$$

where M:; 3×3 matrix coefficient According to an area modulation technique in a normal color printer, no a unique relationship cannot be established between ink densities DY, DM, and DC, and ink areas TY, TM, and TC. Meanwhile, a log function has an extremely wide dynamic range, i.e., a domain of value (0 to ∞) in a domain of defined area [0 to 1]. This results in difficulty in signal processing. Therefore, the direct use of equation (28) requires high precision in a conversion circuit, and as a result, circuit cost is increased. In order to overcome this problem, according to the above embodiment, equation (25) is used in place of the log function, and equation (27) is used so as to convert ink density signals DY, DM, and DC into ink amount designation signals Tj. When matrix coefficient M is appropriately selected, satisfactory color reproduction properties can be obtained as compared to color conversion processing using the normal "masking equation".

In color conversion of a black reference plate, when characters written in a black ink are printed using only a combination of Y, M, and C inks, a sufficient density cannot be obtained. In this case, printing is made using a black ink. When a black ink is appropriately used, an image having high contrast can be obtained in a landscape image. However, when a black ink is mixed in a chromatic color having high saturation, and the mixed color signal is output, the saturation of the color is decreased, and a considerably degraded image is obtained. Therefore, it is ideal that the black plate signal satisfies the following conditions:

(a) When a document is achromatic, its image is output with only a black ink.

(b) The black ink is not output for colors having high saturation such as primary colors (Y, M, C), and bright colors.

(c) A color must be smoothly changed for a color region between conditions (a) and (b).

An example satisfying the conditions (a), (b), and (c) will be described below. In first conversion circuit 416, intermediate color signal DKi for a black ink is calculated in accordance with input color signal Si:

$$DKi = \log(1 - Si^{ni}) \tag{29}$$

for ni > 0.

Color signal DKi is supplied to adder 418, and its linear sum DK is calculated in the same manner as in DY, DM, and DC. Output color signal DK of adder 418 is converted to black-plate ink amount signal TK expressed by the following equation:

$$TK = \exp(nK \cdot DK) \tag{30}$$

for nK > 1.

Ink amount signal TK obtained in this manner satisfies the above-mentioned conditions (a), (b) and (c), and assures reproduction of a good image with high contrast. In this case, in a practical control operation, functions of first and second conversion circuits 416 and 420 are switched or written upon only calculation of the black-plate signal. Thus, signal values of four colors, i.e., Y, M, C and K can be calculated by an identical circuit.

Referring back to FIG. 16, four linear CCD image sensors 402a, 402b, 402c, and 402d in the embodiment described above have slightly different sensitivities and hue characteristics due to limitations on manufacture. (It is undesirable that if selection is performed to cause their sensitivities and color characteristics to strictly coincide with each other, manufacturing yield of products is decreased, resulting in an increase in cost of the apparatus.) In order to provide a color hard copy having uniform color tone over the entire region thereof based on the CCD output signals of linear image sensors 402 having different sense characteristics, "two-step color modulation" by first and second conversion circuits 416 and 420 of the present invention is important.

In order to convert a CCD output signal from each image sensor 402, i.e., color signal Si' into intermediate color signal Dij (j=Y, M, C, K), first conversion circuit 416 contains four look-up data tables therein. While a CCD output signal of first image sensor 402a is transferred to pre-processor 404, a first data table therefor is set in first conversion circuit 416 under the control of CPU 426. While a CCD output signal from second image sensor 402b is transferred to pre-processor 404, a second data table therefor is set in first conversion circuit 416.

Matrix coefficient M is appropriately selected according to the following procedures so as to decrease or compensate for color ununiformity (difference in color tones) caused by a difference in color characteristics at boundary regions 430 and 432 of two adjacent ones of the four CCD image sensors 402 in sensing unit 400, as shown in FIG. 19:

(1) Step of Reading Reference Color

In order to calculate matrix coefficient Mij matching with color separation characteristics of each image sensor 402, a reference color k (k=Y, M, C, R, G, B) is read by image sensing unit 400 to obtain color signal Si.

(2) Step of Calculating Average Value

Average value Pkm of read signals Si of reference colors obtained at boundary pixel regions 430, 431, 432, 433, 434, and 435 (each of which has a size of 64 pixels or less) of two neighboring sensors 402a and 402b, 402b and 402c, and 402c and 402d of four image sensors 402 is calculated. In this case, "P" is a vector quantity consisting of three colors, i.e., R, G and B; "k" is a suffix indicating Y, M, C, R, G, or B. "m" is a number for specifying a boundary pixel region at an end portion of each sensor.

(3) Step of Determining Matrix Coefficient M3

For example, matrix coefficient M3 for a CCD output signal of third image sensor 402c is calculated so that color signal Si obtained in a pixel region located at substantially the center of image sensing unit 400, e.g., pixel region 433 at the left end region of third image sensor 402c, coincides with the reference color signal. In this case, color signal Dj corresponding to a reference color is given as target value Qk. Target value Qk can be calculated from ink dot area Qk' (which corresponds to ink amount designation signal Tj) in accordance with the following equation (31), which is an inverse conversion of equation (27):

$$Qk = \log\{1 - Qk'(1-\rho)\}/\log\rho \tag{31}$$

Matrix coefficient M3 can be calculated from value Qk and average value Pk4 from pixel region 433 (the suffix is 4, since pixel region 433 is a fourth end pixel region of image sensing unit 400 counted from the left) in accordance with the following equation:

$$M3 = \left(\sum_k Qk \cdot Pk4^t\right)\left(\sum_k Pk4 \cdot Pk4^t\right)^{-1} \tag{32}$$

where "t": transpose.

(4) Step of Determining Matric Coefficient M2

Subsequently, a CCD output signal of second image sensor 402b, i.e., matric coefficient M2 for color signals, which optimizes average value Pk3 of produced color signals in pixel region 432 at the right end portion of second sensor 402b, is calculated using average value Pk4 of color signals from pixel region 433 and a value converted by matrix coefficient M3 for color signals from third image sensor 402c as a target value in accordance with the following equation:

$$M2 = \left\{\sum_k (M3 \cdot Pk4)Pk3^t\right\}\left(\sum_k Pk3 \cdot Pk3^t\right)^{-1} \tag{33}$$

(5) Step of Determining Matrix Coefficient M1

Similarly, a CCD output signal of first image sensor 402a, i.e., matrix coefficient M1 for color signals, which optimizes average value Pk1 of color signals produced in pixel region 430 at the right end portion of second sensor 402a, is calculated based on matrix coefficient M2 for color signals from second sensor 402b, color signals Pk2 from pixel region 431 at the left end portion of second sensor 402b, and color signals Pk1 from pixel region 431 at the right end region of first sensor 402a, in accordance with the following equation:

$$M1 = \left(\sum_k (M2 \cdot Pk2)Pk1^t\right)\left(\sum_k Pk1 \cdot Pk1^t\right)^{-1} \quad (34)$$

(6) Step of Determining Matrix Coefficient M4

Finally, matrix coefficient M4 for color signals from fourth sensor 402d is calculated in the same manner as described above in accordance with the following equation:

$$M4 = \left(\sum_k (M3 \cdot Pk5)Pk6^t\right)\left(\sum_k Pk6 \cdot Pk6^t\right)^{-1} \quad (35)$$

where "Pk5" represents a color signal from pixel region 434 at the right end portion of third sensor 402c, and "Pk6" represents a color signal from pixel region 435 at the left end portion of fourth sensor 402d. It should be noted that the step of calculating matrix coefficient M4 may be performed between the step of calculating the average value and the step of determining matrix coefficient M3.

Matrix coefficients M1 to M4 are stored in four look-up table memory areas formed in first conversion circuit 416. Circuit 416 compensates for a difference or variation in color characteristics for each linear CCD image sensor 402 of image sensing unit 400, and performs color conversion processing free from color ununiformity.

Color adjustment processing using first and second conversion circuits 416 and 420 will be described below. In this case, "color adjustment" includes hue rotation, enhancement/reduction of saturation, density conversion, background ununiformity reduction, and the like. FIG. 20 shows the front view of operation panel 430, which comprises hue adjusting knob 440, saturation adjusting knob 442, density level selection switches 444, and background ununiformity reduction level selection switches 446.

Assume that a hue rotational angle is set to be a given value by hue adjusting knob 440. This set value is transmitted to CPU 426. In this case, CPU 426 reads out basic data from ROM 428, and processes the basic data in accordance with the set hue rotational angle. Thereafter, CPU 426 writes the processed data in the table look-up memory of first conversion circuit 416.

Saturation enhancement/reduction is similarly performed such that data processed in accordance with a value set by saturation adjusting knob 442 is written in the table look-up memory in first conversion circuit 416. More specifically, saturation enhancement/reduction can be performed such that a table of a function obtained by substituting with Mij matrix coefficient Mij' (=A·M), which is obtained by multiplying matrix coefficient Aij shown below with matrix coefficient Mij from the left, is written in the table look-up memory:

$$Aij = \frac{1}{3}\begin{pmatrix} 1 + 2a\cos\theta & 1 + 2a\cos(\theta + 4\pi/3) & 1 + 2a\cos(\theta + 2\pi/3) \\ 1 + 2a\cos(\theta + 2\pi/3) & 1 + 2a\cos\theta & 1 + 2a\cos(\theta + 4\pi/3) \\ 1 + 2a\cos(\theta + 4\pi/3) & 1 + 2a\cos(\theta + 2\pi/3) & 1 + 2a\cos\theta \end{pmatrix} \quad (36)$$

where "a" represents a saturation enhancement/reduction ratio, and "$\theta$" represents a hue rotational angle (radian).

Density Conversion

Density conversion is performed such that the table look-up memory in second conversion circuit 420 is rewritten in accordance with the operator's manual operation of one of the density level selection switches 444 on operation panel 430. More specifically, $\rho$ in conversion equation (27) is replaced with $\rho'$ to perform conversion. In this case, $\rho' = b_2\rho$ ($b_2$ is a coefficient and $b_2 > 0$; if $b_2 = 1$, a normal density is obtained). FIG. 21 shows a combination of I/O characteristics in the conversion between Dj and Tj when five levels can be selected b density level selection switches 444, as shown in FIG. 21.

Since the density conversion is performed by rewriting the table look-up memory in second conversion circuit 420, it does not affect a conversion operation of hue information in first conversion circuit 416 upon density conversion. Therefore, optimal I/O characteristics suitable for tone characteristics of an output apparatus such as a color printer can be obtained, and accurate color reproduction can be performed for any output apparatus.

Background Ununiformity Reduction

When reduction of background ununiformity is performed, the content of the table look-up memory in first conversion circuit 416 is rewritten upon operation of background ununiformity reduction level selection switches 446 in basically the same manner as hue rotation and saturation enhancement/reduction. In this case, a conversion equation for obtaining Dij from Si can only be rewritten. More specifically, a value exceeding a given threshold value of Si" prior to multiplication with Mij is output as 0. The conversion equation used in this case is as follows:

$$Si'' = \quad (37)$$

$$\begin{cases} \dfrac{\log\{Si(1-\rho) + \rho\} - \log\{Sf(1-\rho) + \rho\}}{\log\rho - \log\{Sf(1-\rho) + \rho\}} & (Si \leq Sf) \\ 0 & (Si > Sf) \end{cases}$$

or $$Sr' = \quad (38)$$

$$\begin{cases} \dfrac{\log\{Si(1-\rho) + \rho\}}{\log} & (Si \leq Sf - SL) \\ \dfrac{\log\{Si(1-\rho) + \rho\}}{\log} \times \dfrac{ST - Si}{SL} & (ST - SL < Si \leq Sf) \\ 0 & (Si > Sf) \end{cases}$$

In equations (37) and (38), "ST" is a threshold value for input signal Si, and "SL" is a width of a transition region until threshold value processing is performed.

FIGS. 22 and 23 show I/O characteristics in Si→Si" conversion by equations (37) and (38) when five levels can be selected by background ununiformity reduction level selection switches 446, as shown in FIG. 21.

According to this embodiment, the color adjustment for each color can be independently and easily performed.

In the description of the embodiment, output signals Y, M, C, and K are output one by one in a frame-sequential manner. A means for storing color data may be additionally provided to adder 418, so that color signals Y, M, C, and K can be output simultaneously.

FIG. 24 shows an embodiment wherein the contents of first and second conversion circuits 416 and 420 are switched to change output colors of a designated region. In FIG. 24, when X- and Y-coordinate positions of a region for which output colors are to be changed are designated at operation panel 430, values indicating these coordinate positions are set in X- and Y-counters 450 and 452 before the color signals are input. When color image sensor 400 scans the designated region for which of the output colors are to be changed, control signals ("1" level) are input from counters 450 and 452 to AND gate 454, and the contents of first and second conversion circuits 416 and 420 are respectively switched in response to the output signal from AND gate 454. For the designated region, the output colors are changed to those predetermined by the switched table look-up memory regardless of the colors read by color image sensor 400.

In this embodiment, the output color signals are Y, M, C, and K but may be R, G, and B as in input color signals. In this case, the conversion equations in first and second conversion circuits 416 and 420 may adopt linear conversion. This embodiment is effective for an output apparatus such as a color CRT display which utilizes an additive mixture.

Referring now to FIG. 25, there is illustrated a color image processing apparatus, suitable for a color copying machine of the present invention, for changing spatial frequency characteristics and performing region detection processing based on image characteristics. As the characteristic features of the color image processing apparatus of this embodiment, the circuit arrangement is simplified as much as possible, and image regions such as color character patterns, which have substantially the same luminance and have different hues, can be effectively detected.

In FIG. 25, color linear image sensing unit 500 is constituted by a combination of a plurality of the same linear CCD image sensors (not shown in FIG. 25) as in the above embodiments. Color image read signals from image sensing unit 500 are subjected to A/D conversion by A/D converter 502. The output signals of A/D converter 502, i.e., digital image signals, are supplied to compensation circuit 504. Circuit 504 normalizes the input image signals to compensate for variations in sensitivity and differences in color characteristics among image sensors. The output signals from compensation circuit 504 are supplied to color converting circuit 506. Color converting circuit 506 has basically the same arrangement as that in the embodiment shown in FIG. 16 described above. In this embodiment, circuit 506 converts input image color signals R, G, and B into ink amount designation signals Y, M, C, and K in a color printer unit such as a laser printer or thermal printer (not shown) in accordance with equations (39) presented below:

$$Y = g_Y\{f_{YR}(R) + f_{YG}(G) + f_{YB}(B)\} \\ M = g_M\{f_{MR}(R) + f_{MG}(G) + f_{MB}(B)\} \\ C = g_C\{f_{CR}(R) + f_{CG}(G) + f_{CB}(B)\} \\ K = g_K\{f_{KR}(R) + f_{KG}(G) + f_{KB}(B)\}$$ (39)

In color converting circuit 506, calculations of ink amount signals Y, M, C, and K are independently performed.

Color converting circuit 506 includes ROM 508 for sequentially receiving R, G, and B signals, as shown in FIG. 26. ROM 508 stores nine functions $f_{YR}$, $f_{YG}$, $f_{YB}$, $f_{MR}$, $f_{MG}$, $f_{MB}$, $f_{CR}$, $f_{CG}$, and $f_{CB}$ in the form of a table. One function is selected in response to switching control signal 510, and density function conversion is performed for an input color signal, e.g., an R signal. The output signal of ROM 508 is stored in latch circuit 514 through adder 512. For example, when signal Y is calculated, color signal R is input to ROM 508, and function $f_{YR}$ is selected from the data table of ROM 508, thus performing density function conversion. The converted value is input to adder 512, and is then stored in latch circuit 514. Subsequently, when color signal G is input to ROM 508, function $f_{YG}$ is selected from the data table of ROM 508, and density conversion is similarly performed. When the resultant value is input to adder 512, adder 512 calculates $f_{YR}(R) = f_{YG}(G)$. The calculation result is stored in latch circuit 514 in response to control signal 516. When color signal B is input to ROM 508, function $f_{YB}$ is selected in ROM 508, and data conversion is performed. The converted data is supplied to adder 512. Adder 512 calculates $f_{YR}(R) + f_{YG}(G) + f_{YB}(B)$. The calculation result is then stored in latch circuit 518 in response to control signal 520. In this case, latch circuit 514 is reset. When the storage content of latch 518 is supplied to ROM 522, conversion function $g_Y$ is selected in ROM 522, and ink amount designation signal Y is produced for a set of color signals R, G, and in accordance with equation (39). Other ink amount signals M, C, and K are also produced in the same manner as described above.

Ink amount designation signals Y, M, C, and K output from color converting circuit 506 are supplied to low-pass processor 528 of the present invention. Low-pass processor 528 performs 3×3 pixel averaging processing, and outputs signals (called "low-pass signals") from which high-frequency signal components are removed.

Figure 27:
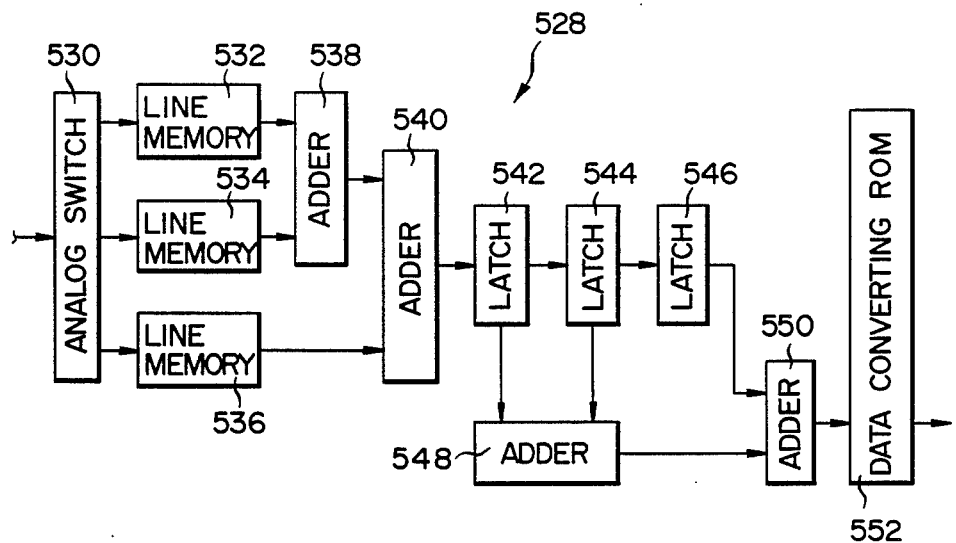
FIG. 27 is a block diagram showing an internal arrangement of a low-pass processor provided to the color image processing apparatus shown in FIG. 25.

FIG. 27 shows the internal circuit arrangement of low-pass processor 528 in detail. The three outputs of analog switch 530 are respectively connected to line memories 532, 534, and 536. Line memories 532 and 534 are connected through adder 538 to the first input of adder 540. Line memory 536 is connected to the second input of adder 540. The sum data from adder 540 is sequentially supplied to latches 542, 544, and 546. The stored data in latches 542 and 544 are added by adder 548, and the sum data is supplied to adder 550. Adder 550 adds the output data from adder 548 to the stored data in latch 546, thus obtaining the sum data of a given pixel and a 3×3 pixel region adjacent thereto. The output data from adder 550 is supplied to data converting circuit 552 including a ROM. The sum data of the 3×3 pixel region is divided by "9" by circuit 552, thus obtaining an average value of this pixel region.

The output data of low-pass processor 528 is supplied to adder 554, which calculates a difference between the average data from circuit 528 and an original signal so as to obtain a so-called "Laplacian signal". The Laplacian signal is supplied to table memory 556, such as a ROM, and is multiplied with predetermined constant K. If original data is given as Y, and averaged data is given as $\overline{Y}$, output signal X from adder 558 is defined by the following equation:

$$X = Y + K(Y - \overline{Y}) \qquad (40)$$

Therefore, output signal X from adder 558 is a signal whose high-frequency components are emphasized.

Figure 28:
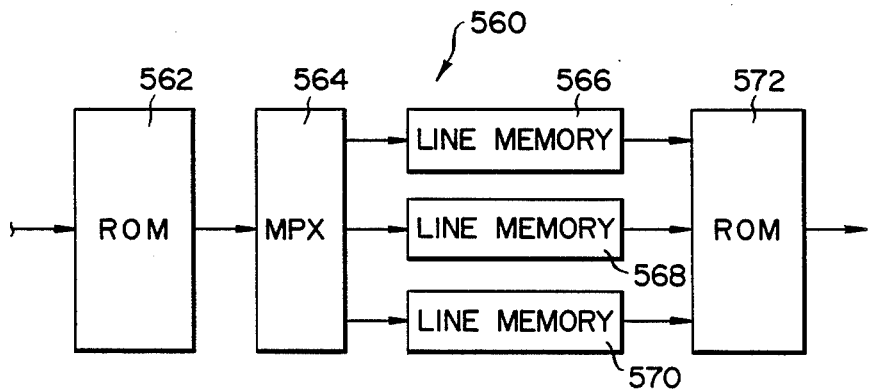
FIG. 28 is a block diagram showing an internal arrangement of a circuit for performing pattern matching for discriminating characters, which is provided to the color image processing apparatus shown in FIG. 25.

The output signal of from adder 554, i.e., the Laplacian signal, is supplied to pattern matching circuit 560 for performing character region discrimination. Circuit 560 performs bi-level pattern matching of a 3×3 pixel region based on the input Laplacian signal when the ink amount designation signals, after color conversion processing, are obtained, thereby discriminating a character region. FIG. 28 shows an internal circuit arrangement of pattern matching circuit 560. The Laplacian signal from adder 554 is supplied to bi-level processor 562 including a ROM. Bi-level processor 562 binarizes the Laplacian signal at a predetermined level or more to produce a bi-level data signal. The bi-level data signal is stored in three 1-bit line memories 566, 568, and 570 through multiplexer 564. The data signals stored in line memories 566, 568, and 570 are read out in units of thee pixels, and are input to character discrimination circuit 572 including a ROM. Circuit 572 produces a character discrimination signal when the input data signal in units of 3 pixels has a combination as a portion of a character pattern.

According to the character region discrimination technique of the present invention, processing of spatial frequency characteristics and region detection processing are performed for color signals of one or two colors which are obtained by color conversion from the read color image signals and include color components which are time-sequentially produced. A circuit for the processing of spatial frequency characteristics and region detection processing can correspond to every ink color (Y, M, C, and K) when parameters are changed upon each scanning, and can be commonly used for all the color signals. Therefore, a processing circuit need not be arranged for each color signal, and hence, the circuit arrangement can be simplified. Furthermore, unlike in a conventional apparatus which performs region discrimination for a character based on only luminance signal components, in the present invention, region discrimination is performed based on a Laplacian signal of a color signal amount signal whose high-frequency components are emphasized by low-pass processor 528. In this manner, characters having an identical brightness (luminance) and different colors can be effectively discriminated.

Figure 29:
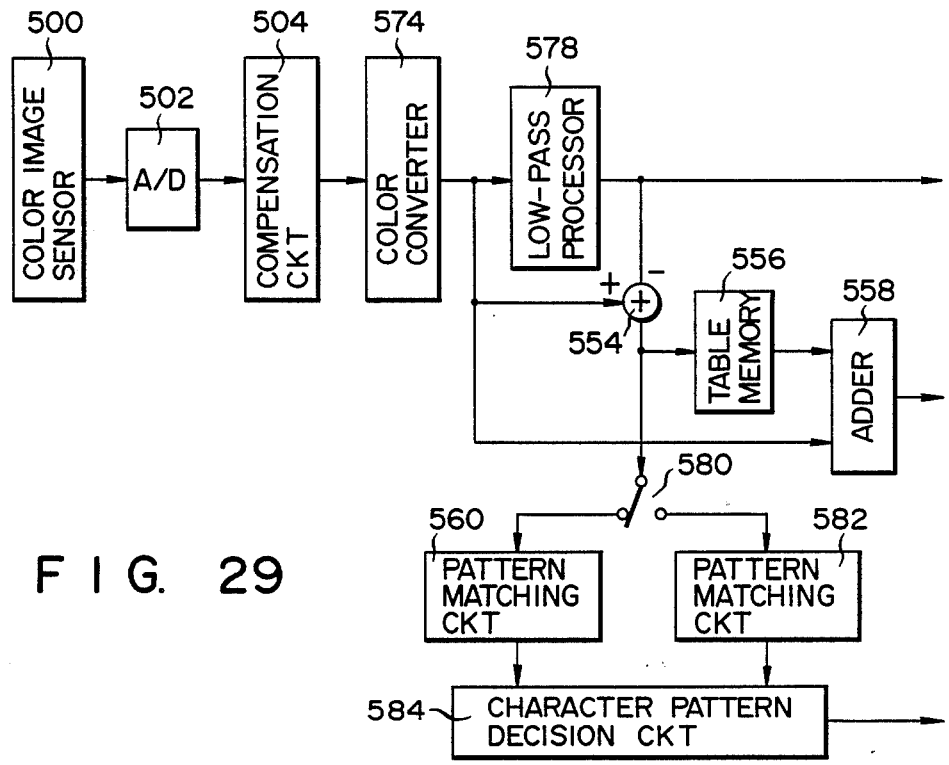
FIG. 29 is a block diagram showing a modification of the color image processing apparatus shown in FIG. 25.

FIG. 29 shows a modification of the circuit shown in FIG. 25 (the same reference numerals in FIG. 29 denote the same parts as in FIG. 25). According to this modification, color conversion circuit 574 is different from circuit 506 of FIG. 25 in that color signals R, G, and B and luminance signal I are calculated simultaneously. Luminance signal I is calculated by:

$$I = R + G + B \qquad (41)$$

Figure 30:
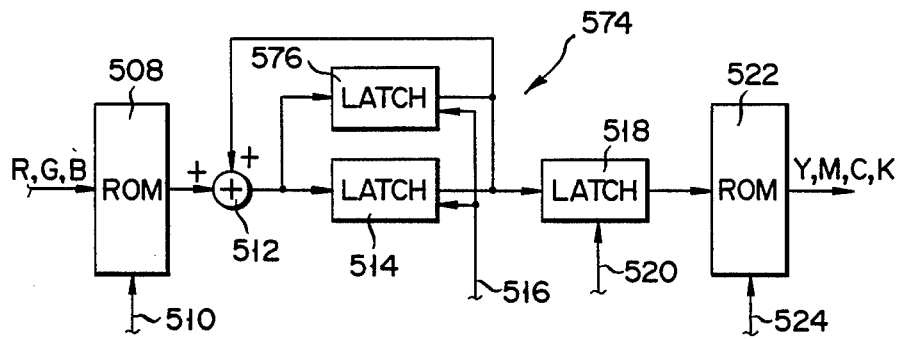
FIG. 30 is a block diagram showing an internal arrangement of a color conversion circuit provided to the color image processing apparatus shown in FIG. 29.

The calculation data is stored in additional latch circuit 576 arranged in parallel with latch circuit 514 in color conversion circuit 574 as shown in FIG. 30.

The low-pass processed signal is converted to an ink amount signal whose high-frequency components are emphasized, by adder 554, constant multiplier 556 including a table memory and adder 558 in the same manner as in the embodiment shown in FIG. 25. The Laplacian signal output from adder 554 is supplied to data selector 580. Data selector 580 separates signal components for designating an ink amount and signal components indicating a luminance from the Laplacian signal. The ink amount designation signal components ar supplied to pattern matching circuit 560 in the same manner as in the embodiment shown in FIG. 25. Pattern matching circuit 560 performs character discrimination processing for the input color ink amount signal components. The luminance signal components of the Laplacian signal are supplied to another pattern matching circuit 582. Pattern matching circuit 582 performs character discrimination processing for the input luminance signal components. The output signals of these pattern matching circuits 560 and 582 are supplied to character pattern decision circuit 584, which performs total character region discrimination using a combination of the character region discrimination results of circuits 560 and 582, in other words, the character discrimination result for the color ink amount signal components and the character discrimination result for the luminance signal components. Therefore, discrimination precision can be improved.

Figure 31:
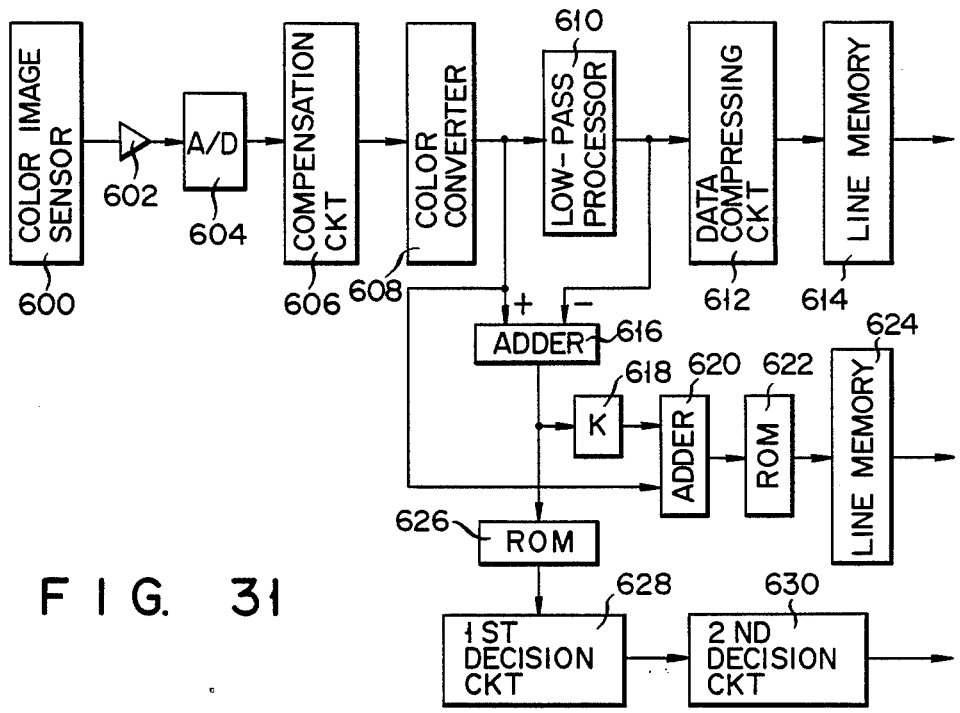
FIG. 31 is a block diagram showing a color image processing apparatus, suitable for a color copying machine of the present invention, for performing "two-step" picture segmentation of a color image.

A color image processing apparatus shown in FIG. 31 suitable for a color copying machine of the present invention is featured in that "two-step picture segmentation processing", including rough and accurate picture segmentation operations, is performed in order to allow a wide-range, high-precision picture segmentation of a read color image without requiring a large-capacity memory.

In FIG. 31, output signals of scanning-type proximity image sensing unit 600 having linear CCD sensors (not shown) are amplified by signal amplifier 602, and are then converted by A/D converter 604 to digital image signals. The output signals of A/D converter 604 are normalized by compensation circuit 606 which performs shading compensation processing. Color converter 608 receives the normalized color signals, and produces signals Y, M, C, and K for designating Y, M, C, and K ink amounts in the same manner as described above.

Ink amount designation signals Y, M, C, and K are sequentially input to low-pass processor 610, and are subjected to 4×4 pixel averaging processing. The output signals of low-pass processor 610 are subjected to pixel thin-out processing by data compression circuit 612, thereby producing 1/16 pixel compressed signals. These signals are then stored in multi-value line memory 614. Since 1/16 image compression processing is performed, the memory capacity of line memory 614 can be reduced to 1/16.

Adder 616 calculates a difference between the output signal (original color image signal) from color converter 608 and the output signal (low-pass signals) from low-pass processor 610 to obtain a Laplacian signal representing a difference from the average value. This signal is supplied to adder 620 through ROM table memory 618 which multiplies an input with given constant K. Adder 620 adds this signal to the output signal (original color image signal) of color converter 608, and produces a color signal whose high-frequency components are emphasized. The output signal of adder 620 is binarized by bi-level ROM 622, and the bi-level signal is stored in bi-level image line memory 624.

The output signal from adder 616 is supplied to a character discrimination unit which is constituted by bi-level ROM 626 and first and second decision circuits 628 and 630 so as to perform "two-step picture segmentation processing" of the present invention. The Laplacian signal output from adder 616 is binarized by bi-level ROM 626, and is supplied to first decision circuit 628 which performs local character decision. First decision circuit 628 performs primary character decision using a pattern matching technique based on a bi-level pattern of the Laplacian signal of a 4×4 pixel region consisting of a given pixel and pixels around it.

Figure 32:
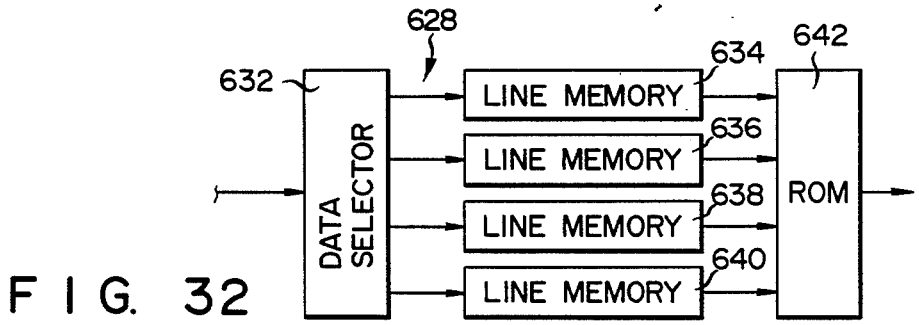
FIG. 32 is a block diagram showing an internal arrangement of a first decision circuit provided to the color image processing apparatus shown in FIG. 31.

As shown in FIG. 32, first decision circuit 628 has data selector 632, the outputs of which are respectively connected to 1-bit line memories 634, 636, 638, and 640. The bi-level Laplacian pattern signals are sequentially selected by data selector 632 in units of 4 pixels, and are stored in the corresponding line memories. The storage contents of line memories 634, 636, 638, and 640 are supplied to pattern matching circuit 642 including a ROM. Circuit 642 produces a signal "1" when it detects a combination of data like a character in input data; otherwise, it produces a signal "0".

Figure 33:
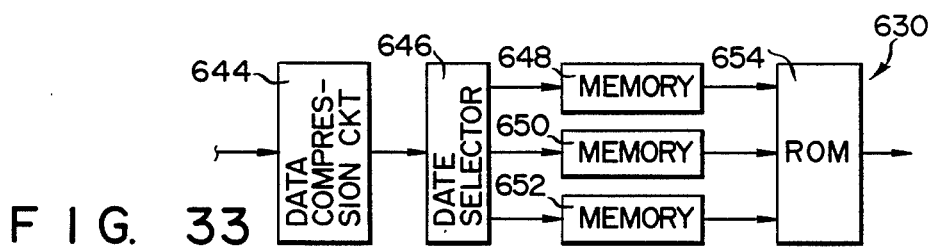
FIG. 33 is a block diagram showing an internal arrangement of a second decision circuit provided to the color image processing apparatus shown in FIG. 31.
Figures 34A, 34B, 34C, 34D, 34E, 34F:
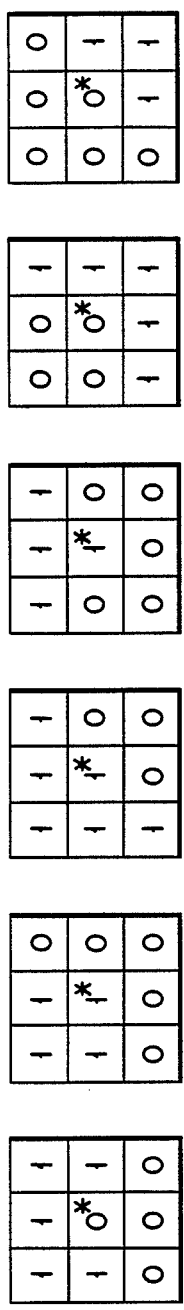
FIGS. 34A to 34F are diagrams showing some typical pixel patterns stored in a ROM arranged in the second decision circuit shown in FIG. 33.

The output signal of first decision circuit 628 is then supplied to second decision circuit 630, which includes data compression circuit 644 (which is arranged to perform the same pixel thin-out processing as that by circuit 610 shown in FIG. 31), as shown in FIG. 33. The output signal of circuit 644 is sequentially selected in units of 4×4 pixels by data selector 646, and the selected signals are sequentially stored in 1-bit line memories 648, 650, and 652. The storage contents of line memories 648, 650, and 652 are supplied to pattern matching circuit 654 including a ROM in units of, e.g., 3 pixels. ROM 654 stores pattern decision data shown in, e.g., FIGS. 34A to 34F. When the input data coincides with any one of patterns shown in FIGS. 34A to 34C, ROM 654 discriminates that the input data (for pixel points indicated by marks "*" in FIGS. 34A to 34C) is a character. If the input data coincides with any one of patterns shown in FIGS. 34D to 34F, ROM 654 performs statistical processing as disclosed in, e.g., Japanese Patent Disclosure (Kokai) No. 60-204,177, thus performing rough character decision.

Figure 35:
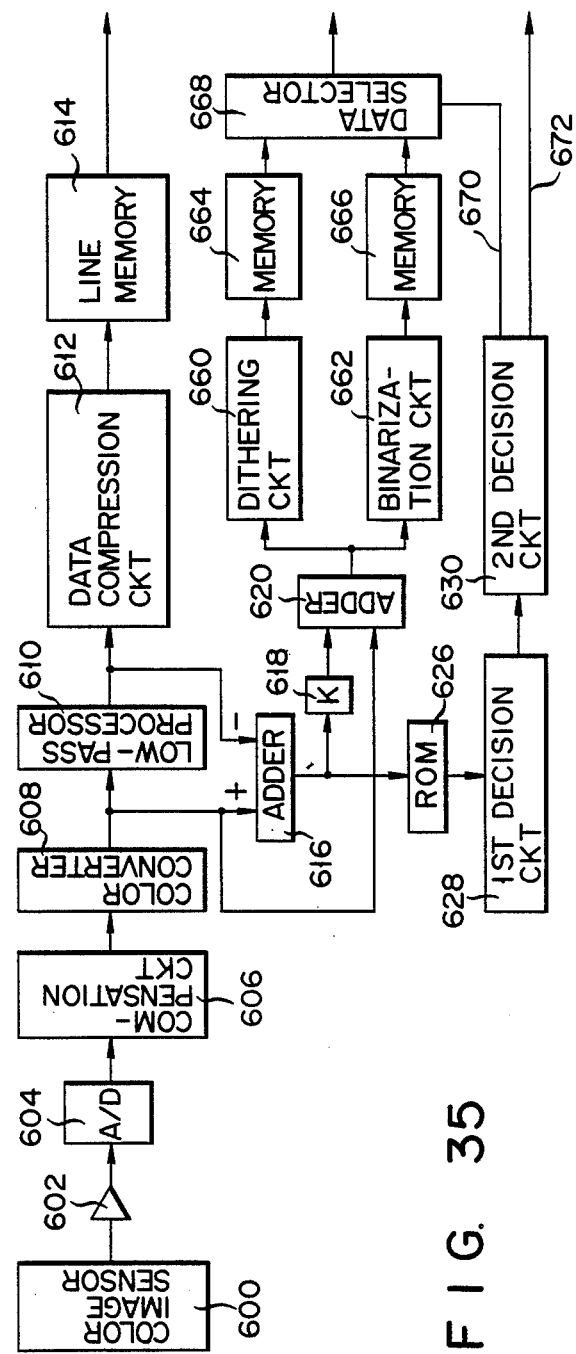
FIG. 35 is a block diagram showing a modification of the color image processing apparatus shown in FIG. 31.

FIG. 35 shows a modification of the circuit arrangement of FIG. 31, wherein the same reference numerals in FIG. 35 denote the same parts as in FIG. 31, and a detailed description thereof will be omitted. The circuit arrangement shown in FIG. 35 is featured in that a high-frequency emphasized signal is simultaneously subjected to binarization and Dither processing operations. More specifically, the output signal from adder 620 is supplied to dithering circuit 660 and binarization circuit 662. The dithered signal from circuit 660 is stored in 1-bit memory 664. The binarized signal from circuit 662 is stored in 1-bit memory 666. Data selector 668 selectively outputs binarized and dithered data in accordance with the decision result of second decision circuit 630. When the pixel pattern region has a half-tone emphasized pattern, the output data from line memory 614 is used. When the pixel pattern region represents a character or line image, the binarized data stored in memory 666 is used. In other cases, dithered data stored in memory 664 is used. Therefore, pattern matching circuit 630 discriminates three levels of pixel patterns: a signal for distinguishing a bi-level image of a character or line image from other images is produced onto first output signal line 670; a signal for designating whether a half-tone image pattern is subjected to multi-value or bi-level representation is produced onto second output signal line 672. For example, for the pixel pattern shown in FIG. 34F, a signal for specifying that dithered image data stored in memory 664 is employed is produced onto signal line 670, whereas a signal for specifying binarized image data is produced onto signal line 672. In this manner, since dithered image data is present between half-tone and bi-level image data continuity of image data can be improved.

Figure 36:
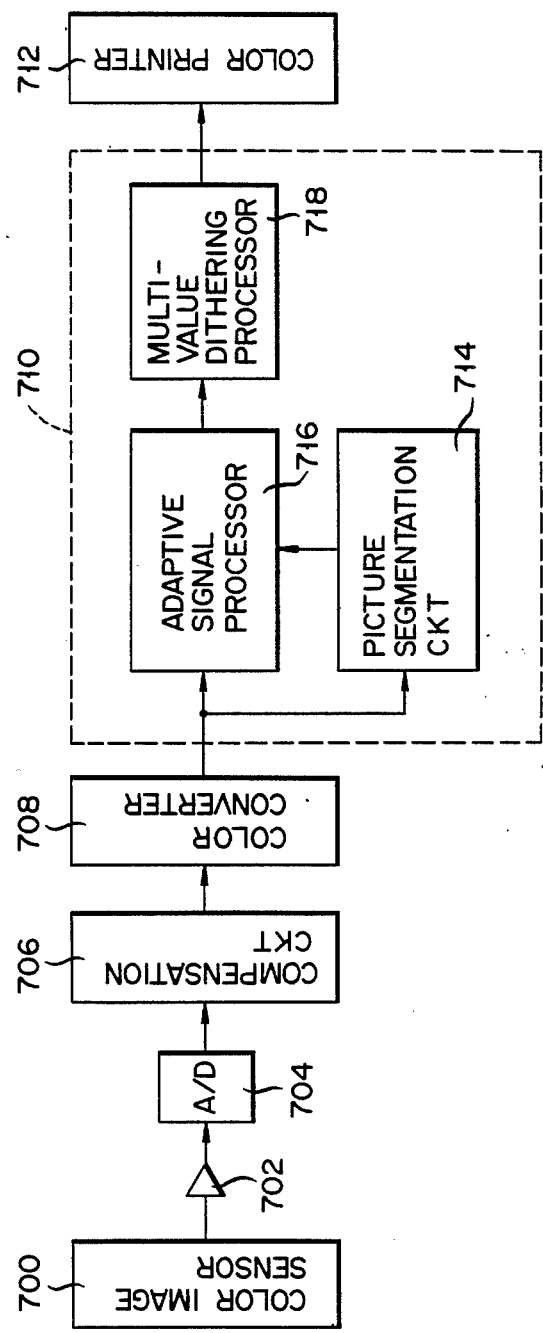
FIG. 36 is a block diagram showing the overall arrangement of an image processing apparatus suitable for a color copying machine of the present invention.

A color image processing apparatus shown in FIG. 36, suitable for a color copying machine of the present invention, is featured in that optimal image processing (e.g., for a screen-tone image region, a high-frequency range is suppressed; for a bi-level image region, a filter gain is increased to perform high-frequency emphasis and the inclination of gamma characteristics is increased; and for a half-tone image, intermediate processing of the above two types of image regions is performed) is performed for discriminated various image components so as to allow outputting of a high-quality image (with low moire noise and high image resolution density) in which bi-level image screen-tone image, and half-tone image (e.g., photograph image) components are mixed. In a pattern matching process for image discrimination, an input image is subjected to pattern matching to discriminate image types in units of pixel pattern regions having a size larger than a size ½ a dither matrix.

In FIG. 36, color read image signals output from scanning-type proximity linear image sensing unit 700 are supplied to A/D converter 704 through amplifier 702. The digital image signals output from A/D converter 704 are supplied to color compensation circuit 706. The normalized image signals output from circuit 706 are supplied to color converter 708 which is arranged in the same manner as those in the above embodiments. Color converter 708 converts input image signals R, G, and B into ink amount designation signals Y, M, C, and K in the same manner as in the above embodiments. The ink amount designation signals are supplied to signal processing unit 710 of the present invention.

Signal processing unit 710 modifies the input ink amount signals, and thus allows production of a color hard copy so that a resolution and color tone of an input original image can be appropriately expressed in accordance with different types of image components included in the ink amount signals of an input image, such as bi-level image components, screen-tone image components, and half-tone image components, in image output unit 712, which includes a color printer such as a laser printer (not shown) or thermal printer. More specifically, signal processing unit 710 performs signal processing for maximizing a resolution for bi-level image components included in the input image; and performs signal processing for improving tone characteristics and minimizing moire noise for screen-tone or half-tone image (photograph image) components included in the input image.

Signal processing unit 710 has picture segmentation circuit 714, which performs, based on a character pattern matching technique, local picture segmentation processing for the ink amount signals of the input image, thereby extracting image regions corresponding to the bi-level image components, screen-tone image components, and half-tone image components included therein. A discrimination result signal (pattern matching result signal) generated from circuit 714 is supplied to adaptive signal processor 716. Circuit 716 serves to perform appropriate signal processing in accordance with the types of image components included in the input image. The optimized input image ink amount signals produced by circuit 716 are supplied to multi-level dithering processor 718.

Picture segmentation circuit 714 has basically the same arrangement as that disclosed in Japanese Patent Disclosure (Kokai) No. 60-204,177. The operation of circuit 714 will be described below. Each ink amount signal input to circuit 714 is supplied to a low-pass processor (although not shown in FIG. 36) so that its low-frequency components are removed, thereby producing a Laplacian signal whose high-frequency components are emphasized. The Laplacian signal is binarized using an appropriate threshold value so as to obtain a Laplacian pattern having a two-dimensional pixel region pattern consisting of a given pixel of interest and pixels around it. Since the Laplacian pattern changes largely depending on the types of images, the pattern is checked to discriminate the type of input image with high probability.

In a bi-level image, such as a character or a line image illustration, peak values of a pixel density tend to continue. FIGS. 37A and 37B exemplify such a Laplacian pattern. In FIGS. 37A and 37B, "0"- and "1"-level pixels of a bi-level signal are respectively indicated by marks "□" and ■.

In a screen-tone image, peak values of the pixel density tend to be scattered. FIGS. 37C and 37D exemplify such a Laplacian pattern. The Laplacian pattern size resembles a distribution period of dots. If a wider pixel region is extracted, this tendency is enhanced.

In a half-tone image, such as a photograph image, a background portion of a character image or a solid portion of a screen-tone image, since a change in pixel density is relatively small, the Laplacian signal is substantially represented by "0" levels. FIGS. 37E and 37F exemplify such a Laplacian pattern.

When an input image is constituted by two types of image components, e.g., bi-level and screen-tone images, a frequency of generation of a Laplacian pattern of each of the bi-level and screen-tone images in the input image changes, as is shown in FIG. 38. A Laplacian pattern is plotted along the abscissa of the graph in FIG. 38; a relative frequency is plotted along the ordinate. As can be seen from this graph, the Laplacian pattern has a pattern region generated for only a bi-level image (typically, region A), and a pattern region generated for only a screen-tone image (typically, region E). By utilizing this tendency, the type of an input image can be discriminated with high precision. More specifically, the data shown in FIG. 38 is stored in a memory (not shown) included in picture segmentation circuit 714 shown in FIG. 36 in the form of a data table. The picture segmentation processing performed in circuit 714 can be effectively performed with reference to this data table.

Segmentation circuit 714 shown in FIG. 36 performs pattern matching in units of a pattern region of an input image having a size larger than a size of at least ½ a dither matrix used in multi-value dithering processor 718, thereby detecting an image type. In other words, the pattern size of an input image to be subjected to pattern matching is set to be larger than a size of ½ the dither matrix. This allows suppression or minimization of moire noise in an execution process of dither processing of an input screen-tone image.

Figure 39A:
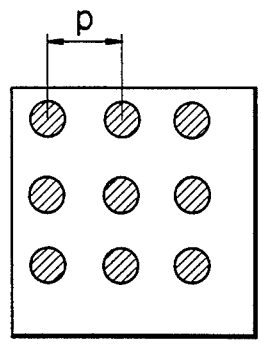
FIGS. 39A to 39E are diagrams showing relationships between Laplacian patterns and pattern matching unit regions.
Figure 39B:
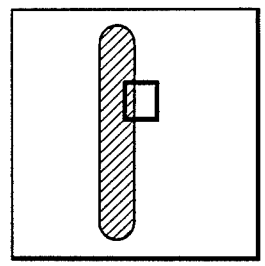
Figure 39C:
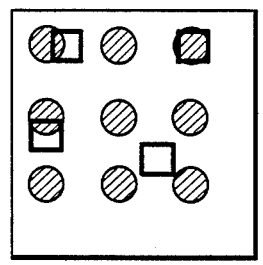

The reason for this will be explained below. Since low-frequency components are removed from the Laplacian pattern of a screen-tone image by the above-mentioned low-pass processing, the Laplacian pattern of the screen-tone image is a repetitive pattern of pixels at a duty ratio of about 50%, as shown in FIG. 39A. Meanwhile, in the Laplacian pattern of a bi-level image, a high-density pixel region at least locally continues, as shown in FIG. 39B. When the pattern size (illustrated by bold lines in FIGS. 39B and 39C) of an input image to be subjected to pattern matching, is ½ or less the size of the dither matrix (i.e., period p of a high-density dot pattern), pattern matching which is made in this pattern region cannot effectively function so as to clearly determine whether the pattern corresponds to the bi-level or screen-tone image. This is because in the narrow pattern region as described above, the similarity between the bi-level and screen-tone image is high, and sufficient matching data for specifying one of the bi-level and screen-tone images cannot be obtained.

Figure 39D:
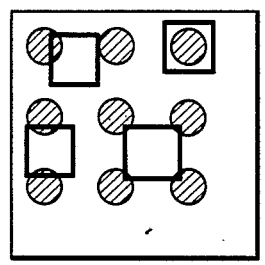
Figure 39E:
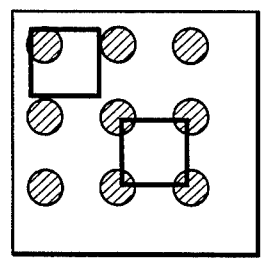

FIG. 39D shows a case wherein a unit pattern size subjected to pattern matching is set to be ¾ dither matrix p. If the pattern matching unit pattern size is increased to this size, pattern matching result data obtained in this region can have a sufficient content enough to determine whether the image pattern corresponds to either bi-level or screen-tone image. In other words, the pattern matching result data can have a sufficient content that can satisfactorily specify the feature patterns of various types of images. If the pattern matching unit pattern size is increased to be equal to a size 1/1 dither matrix p, as shown in FIG. 39E, the reliability of the pattern matching result can be further improved, and precision of picture segmentation can also be improved.

It should be noted that segmentation circuit 714 of the present invention does not output a completely definite image type discrimination signal for specifying a single type of image based on the pattern matching result. In the above-mentioned case (i.e., a case wherein an input image is constituted by bi-level and screen-tone image components), when a pattern matching result indicating that the input image pattern region is a bi-level image at a probability of 60% and is a screen-tone image at a probability of 40% is obtained (it may occur when the Laplacian pattern is included in region C of the graph shown in FIG. 38), segmentation circuit 71 of the present invention outputs a multivalue discrimination result signal in accordance with the probabilities of the image components. This multivalue discrimination result signal is called a "character-likelihood signal".

Generation of the "character-likelihood signal" by segmentation circuit 714 will be described below in detail. More specifically, a character-likelihood signal for each pattern is determined as follows. If relative frequencies for generation of pattern k in bi-level and screen-tone images are respectively given as Hc(k) and Hs(k), posterior probabilities Pc(k) and Ps(k) with which the pixels of pattern k correspond to a bi-level image and a screen-tone image (to be referred to simply as probabilities hereinafter) are respectively expressed as follows based on the Bayes theorem:

$$Pc(k) = Hc(k) \cdot Pc0/P(k) \tag{42-a}$$

$$Ps(k) = Hs(k) \cdot Ps0/P(k) \qquad (42\text{-}b)$$

where Pc0, Ps0, and P(k) are, respectively, probabilities of bi-level and screen-tone images in all the images, and a frequency of appearance of pattern k.

Character-likelihood signal Q(k) of pattern k is determined as follows as a logarithm of a ratio of Pc(k) to Ps(k):

$$\begin{aligned} Q(k) &= \log\{Pc(k)/Ps(k)\} \\ &= \log\{Hc(k)/Hs(k)\} + c \end{aligned} \qquad (43)$$

(c: constant)

The larger the value of signal Q becomes, the higher the likelihood of a bi-level image, whereas the smaller the value of signal Q becomes, the higher the likelihood of a screen-tone image. If the value of signal Q is positive, the probability of the bi-level image is increased; otherwise, the probability of the screen-tone image is increased. Signal Q(k) is output as a character-likelihood signal of the pixel directly or after being appropriately quantized.

For a background pattern shown in FIGS. 37E and 37D, a value near 0 is assigned as a character likelihood. Such assignment is effective since (1) relative frequencies of both a character image and a screen-tone image are high in the background portion, (2) intermediate processing between those for the character image and the screen-tone image is preferably performed as adaptive processing of the background portion, and so on.

The character-likelihood signal obtained in this manner does not always have high discrimination precision, and randomly causes a discrimination error. Causes therefor are (1) a Laplacian pattern is modified due to noise added to an input image signal, (2) patterns having high frequencies of appearance are present in both the bi-level image and the screen-tone image, and so on. For this reason, the discrimination precision of the character-likelihood signal is improved by the following large-area processor.

The principle of improving the discrimination precision by the large-area processor will be explained below. In a normal image, a bi-level image region, a screen-tone image region and a photograph image region are not mixed in a complicated manner. For example, if a given pixel is present in a bi-level image region, the possibility that the adjacent pixel is a bi-level image region is very high. Therefore, if a character-likelihood signal of the given pixel is very large, and all the character-likelihood signals of adjacent pixels are small, the character-likelihood signal of the pixel can be considered to be small. The large-area processor performs correction like this. As described above, the large-area processor also has an effect of smoothing a periodicity of the discrimination result of a screen-tone image. In this embodiment, the large-area processor is realized by spatial smoothing of the character-likelihood signal. More specifically, if a character-likelihood signal of pixel x is given as Q(x), Q'(x) is calculated as follows:

$$Q'(x) = \sum_y Q(x + Y) / \sum_y \qquad (44)$$

(where y is a vector indicating a surrounding region).

A signal obtained by appropriately quantizing Q'(x) is used as discrimination signal R as a final output of picture segmentation circuit 714. Assume that an image within the smoothed region is an identical type of image, and noise components of character-likelihood signals Q in the smoothed region are independent of each other. In this case, probability Pac that the region corresponds to a bi-level image and probability Pas that the region is a screen-tone image are respectively given by:

$$Pac = \prod_y Pc(x + y) \cdot cl \qquad (45\text{-}a)$$

$$Pas = \prod_y Ps(x + y) \cdot cl \qquad (45\text{-}b)$$

Therefore, logarithm Qa of the ratio of these probabilities is as follows:

$$\begin{aligned} Qa &= \log(Pac/Pas) \\ &= \Sigma \log(Hc/Hs) + c \\ &= \Sigma Q \end{aligned} \qquad (46)$$

That is, Q' represents a character likelihood in the smoothed region as in equation (44). If the type of pixel is discriminated in accordance with the level of character-likelihood signal Q', the discrimination result can be an optimal estimation under the above assumption, and high discrimination precision can be obtained.

FIG. 40 shows a detailed internal arrangement of picture segmentation circuit 714 based on the above principle. Image signal 720 which is compensated/normalized by compensation circuit 706 for performing shading compensation shown in FIG. 36 is input to digital filter 722. FIGS. 41 and 42 show the kernel and frequency response of digital filter 722. Filter 722 is one kind of Laplacian filter and its output signal 724 serves as a Laplacian signal representing high-frequency components of an image.

Laplacian signal 724 is binarized by binarization circuit 726 using threshold value T, which is set to be slightly larger than zero to provide a noise nonsensitive range for removing small noise components included in the input image. The binarized signal output from binarization circuit 726 is supplied to pattern matching circuit 728.

Pattern matching circuit 728 includes line memory section 730 and table memory 732. Table memory 732 stores reference decision data of Laplacian patterns. The binarized signal is transferred to line memory section 730, and is converted thereby to a two-dimensional Laplacian pattern. Pattern matching circuit 728 compares and collates the Laplacian pattern thus obtained with the storage pattern data in memory 732 to perform pattern matching processing, and specifies an image type (i.e., one of a screen-tone image, a bi-level image or a half-tone image) of a pixel pattern region consisting of a pixel of interest and pixels around it. Circuit 728 then produces pattern matching result signal 734 for each pixel as the above-mentioned "character-likelihood signal".

In this embodiment, the dither matrix of multi-value dithering processor 718 is set to be 4×4, and the size of unit pixel pattern region subjected to single pattern matching in circuit 714 is also set to be 4×4. According to this embodiment, pattern matching result signal 734 is a 3-bit digital signal, which is obtained by quantizing a value calculated by equation (43) using seven threshold values at equal intervals (or which can be at different intervals). The 3-bit digital signal is a multi-value signal which can have eight different signal levels. Use of a digital signal having such a number of bits contributes to save the capacity of pattern table memory 732.

Figure 43:
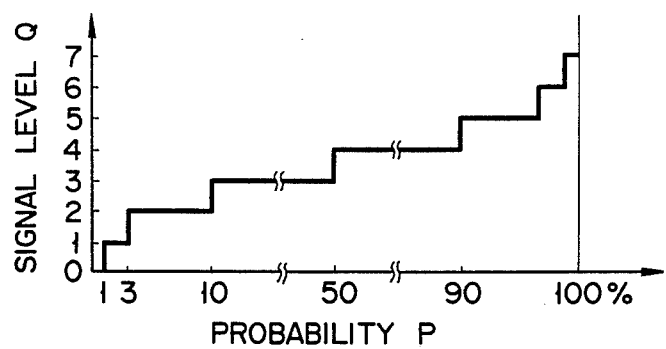
FIG. 43 is a graph showing probability data of a quantizer shown in FIG. 40.

In segmentation circuit 714, 3-bit digital signal 734 representing the pattern matching result is supplied to averaging circuit 736 including a smoothing circuit. Averaging circuit 736 performs averaging (smoothing) based on a convolutive addition for the 3-bit digital pattern matching result signal which is obtained for nine pixels consisting of a pixel of interest and eight adjacent pixels. The output signal from averaging circuit 736 is quantized by quantizer 740, thus producing 3-bit discrimination signal 742. Since discrimination signal 742 is a multi-value signal having eight levels of 0 to 7, a probability that an image component is a character for each level is defined as shown in FIG. 43. The probability data shown in FIG. 43 is stored in a memory (not shown) in quantizer 740 in the form of a table. For example, it discrimination signal 742 is level "2", a probability that the image is a character is 3% to 10%; and if discrimination signal 742 has level "7", it can be determined that the image is a character.

In signal processing unit 710 of the present invention, multi-value discrimination signal 742 is supplied from segmentation circuit 714 to adaptive signal processor 716. Processor 716 performs optimal image processing corresponding to the decided type of image for ink amount signals Y, M, C, and K of an input original image in response to discrimination signal 742, thereby improving quality of an output image at thermal color printer 712 through multi-value dithering processor 718. Printer 712 produces a hard copy of a multi-tone color image based on an "area modulation method", and more preferably, a "multi-value dither method" as an extended version of an ordered dither method.

Multi-value dithering processor 718 receives the adaptive-processed signal output from adaptive signal processor 716, and converts it into an n-value signal using (n−1) threshold values t1 to t(n−1), thereby producing a drive signal for a thermal printing head of printer 712. The drive signal is a signal for designating a pulse width to be supplied to heat-generation resistive elements (not shown) serving as recording elements of the thermal head of the printer. A heating amount of the thermal head is controlled to have n different levels for colors Y, M, C and K, thus modulating recording ink amounts of a hard copy.

Figure 44:
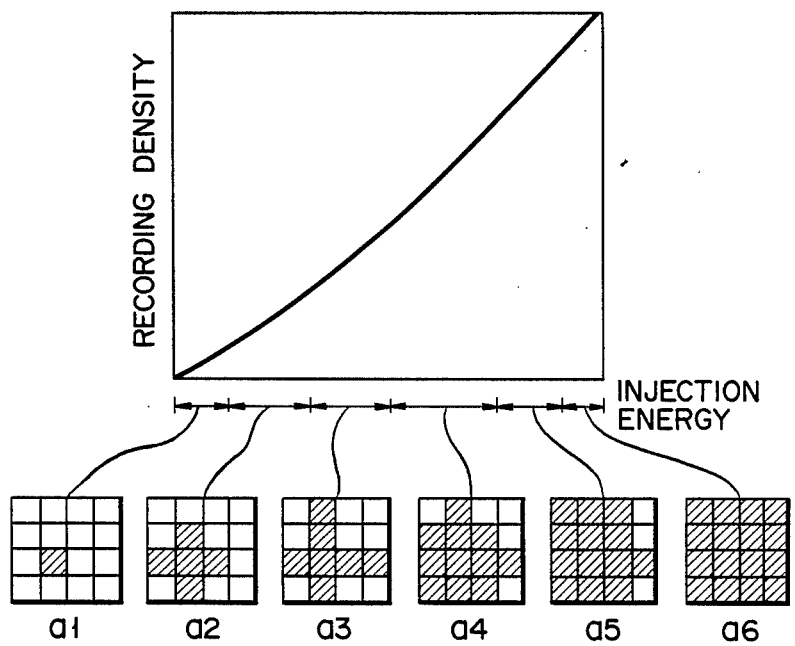
FIG. 44 is a diagram showing some standard tone patterns of a hard-copy image generated by a printer unit shown in FIG. 36.

The head drive signal is controlled to constitute one tone pattern using a set of a predetermined number of pixels corresponding to one dither threshold value matrix of a hard copy. The tone pattern is selected from six tone patterns a1 to a6 shown in FIG. 44 in accordance with a recording density of an image to be output. In this case, one tone pattern has 4×4 pixels. For example, in tone pattern a3, seven pixels arrayed in a cross shape are recorded upon application of appropriate current pulses, and the remaining nine pixels are not recorded at all. These tone patterns a1 to a6 have good tone characteristics in the corresponding density regions, and suppress noise caused by undesirable attachment of ink to hard copy paper. Use of these tone patterns a1 to a6 allows printing of a high-quality hard copy. In particular, in generation of a hard copy of half-tone image components included in an input image whose image density changes moderately, natural print quality can be obtained.

Although the above-mentioned multi-value dither method can realize stable, high tone characteristics, it has the following two drawbacks. First, when an edge of an original image is ideally sharp, that is, when image densities of adjacent pixels are changed from "0" to "1", or "1" to "0", the edge can be expressed sharp after the dither processing. However, if an image is blurred to have an unclear edge at color image sensor 700, this portion may be expressed dotted or roughened, or a line thickness may differ, thus impairing high resolution of an image. Second, when an original image has regular periodic components resembling a dither period, a low-frequency regular pattern which is not present in the original image appears in an output image as moire noise, thus considerably degrading image quality.

In order to prevent such degradation in multi-value dithering processor 718, if an original image is a bi-level image such as a character image or a line image, adaptive signal processor 716 compensates for a decrease in high-frequency components at the image sensor by high-frequency emphasis processing, and performs gamma conversion processing to make an edge portion of a character or line sharp, thereby preventing an unclear edge or a dotted edge caused by dithering. When an original image is a screen-tone image, and in particular, when it is a screen-tone image whose screen-tone period is approximate to a dither period, a read image signal is passed through a low-pass filter for removing dither periodic components to prevent generation of moire noise caused by dither processing. Since gamma conversion processing impairs tone reproducibility, it is not performed when an original image is a tone image, i.e., a screen-tone image or a photograph image.

When the type of image is clearly determined, the above-mentioned adaptive processing is performed so that a high-quality image can be output for any type of input image. However, in picture segmentation circuit 714 described above, picture segmentation is sometimes unsuccessful. In this case, an intermediate discrimination signal is output. For a region in which the type of image is not clarified, processing is preferably performed using intermediate parameters for the following reasons.

First, the improvement of image quality cannot overcome degradation of image quality due to inappropriate processing. The multi-value dither method can inherently assure a certain image quality for both the bi-level and screen-tone images; moire noise is not caused for the screen-tone image unless a region which cannot be discriminated continues in a large area.

Second, there is a high possibility that pixels which cannot be discriminated are pixels having small features of the bi-level or screen-tone image. In this case, image degradation does not occur even if processing is performed using intermediate parameters.

A detailed arrangement of adaptive signal processor 716 shown in FIG. 36 will be described with reference to FIG. 45. Image signal 746 supplied from shading compensation circuit 706 shown in FIG. 36 is input to first filter 748, and is subjected to 2×2 smoothing processing. The output signal from first filter 748 is supplied to second filter 750. FIGS. 46A and 46B respectively show kernels of these filters 748 and 750.

The output signal from first filter circuit 748 is also supplied to delay circuit 752. Delay circuit 752 performs delay processing, and produces a delay signal which is delayed by one pixel in both main scanning and sub-scanning directions. The delay signal and the output signal from second filter 750 are supplied to subtractor 754. Subtractor 754 calculates a difference between the input signals and produces difference signal 756. Difference signal 756 represents the high-frequency components of an original image signal. The calculation of the high-frequency components is common to that as in digital filter (serving as Laplacian filter) 722 in FIG. 40, which has been described with reference to FIGS. 41 and 42. Therefore, difference signal 756 is commonly used in picture segmentation circuit 714 shown in FIG. 36.

The output signal of delay circuit 75 is delayed by a certain number of pixels by delay circuit 758. Difference signal 756 is delayed by a certain number of pixels by delay circuit 760. Signal delay processing in delay circuits 758 and 760 is to compensate for a delay time in signal transmission due to execution of pattern matching processing for discriminating the type of image. The output signal of delay circuit 760 is a delay signal representing high-frequency components. This signal is supplied to multiplier 762. When multiplier 762 receives a signal obtained by multiplying discrimination signal 742 supplied from quantizer 740 with constant k by constant memory 764, it multiplies the k-times discrimination signal with the output signal from delay circuit 760. The output signal of multiplier 762 is supplied to adder 764.

Adder 764 adds the output signals of delay circuit 758 and multiplier 762 to produce high-frequency modulated signal 766. Gamma converter 768 is provided to receive high-frequency modulated signal 766 and discrimination signal 742. Gamma converter 768 performs gamma conversion processing of high-frequency modulated signal 766 in accordance with the discrimination result represented by discrimination signal 742. The output signal of gamma converter 768 is supplied as a high-frequency modulated signal to adaptive signal processor 716 shown in FIG. 36.

High-frequency modulated signal 770 is a signal of a different high-frequency gain in accordance with constant k to be multiplied. For example, if k=0, high-frequency modulated signal 770 becomes equal to the output signal from delay circuit 758. If k=−1, signal 770 becomes equal to the output signal from second filter 750, and hence, no moire noise is generated due to a 4×4 dither period. If k>0, signal 770 becomes a high-frequency emphasized signal in accordance with the value of k.

Gamma converter 768 performs conversion of input signal x (i.e., output signal 766 from adder 764) represented by the following equation:

$$y = a(x - b) + b \quad (47)$$

If b=0.5 and a=1, identical transformation is performed, and if a>1, gamma conversion according to the value of 0, a is performed.

Processing parameters such as k, a, and b are switched in accordance with the discrimination result of the image type represented by discrimination signal 742 shown in FIG. 40, which is output from picture segmentation circuit 714. FIG. 47 shows an example of selection of processing parameters for values Q (=0 to 7) of discrimination signal 742. As shown in FIG. 47, if signal value Q is large, i.e., the likelihood of a bi-level image is large, the values of parameters k and a are increased to emphasize high-frequency components and to increase the inclination of the gamma characteristic curve, thereby recording a sharp image.

If signal value Q is small, i.e., if the likelihood of a screen-tone image is large, parameters k and a are respectively set to be −1 and 1 to remove components causing moire noise due to dither processing, and an inclination of gamma conversion curve is set to be 1 to assure tone characteristics.

If signal value Q is 0, i.e., if the likelihood of a bi-level image is 0, parameter k is set to be an appropriate value to compensate for a decrease in high-frequency components at an image sensor, and a=1 to maintain tone characteristics.

When optimal signal adaptive processing is performed in accordance with the discriminated types of image components of an input original image, optimal processing can be performed if the original image is any of a bi-level image such as a character image, a line image or the like, a screen-tone image or a photograph image, and a high-quality image output can be obtained. Even if a discrimination error occurs or a portion which cannot be discriminated is present, degradation in image quality can be minimized.

Although the invention has been described with reference to specific embodiments, it shall be understood by those skilled in the art that numerous modifications may be made within the spirit and scope of the inventive contribution.

For example, in picture segmentation circuit 714 included in signal processing unit 710 shown in FIG. 36, averaging of 3-bit digital pattern-matching result signal 734 output from pattern matching circuit 728 shown in FIG. 40 is not limited to smoothing of signal 734 by averaging circuit 736.

In the above embodiment, a background portion is regarded to have an intermediate characteristic between bi-level and screen-tone images, and a value approximate to 0 is assigned to the character-likelihood signal. However, in general, since the background portion is often present adjacent to an edge of a bi-level image, the character-likelihood signal tends to be a value approximate to 0 at a boundary of regions (in particular at an edge portion of a bi-level image). More specifically, the background portion tends to be recognized as an intermediate image between bi-level and screen-tone images.

Thus, another method may be proposed wherein the background portion is not regarded to be an intermediate region between bi-level and screen-tone images but is regarded to be another dimension. For example, a value corresponding to levels of probabilities of bi-level and screen-tone images is not assigned to the background portion as the character-likelihood signal; an independent code as the background portion is assigned thereto as a discrimination result. The large-area processor performs averaging, while pixels discriminated as the background portion are ignored. More specifically, character-likelihood addition is made excluding pixels as a background portion of those around a pixel of interest; division is made with the number of pixels including the pixels as the background portion. With this method, although the processor is rather complicated, the likelihood of an edge of a bi-level image adjacent to the background portion can be increased.

Another discrimination processing method as an extended version of this method may be proposed which is based on the fact that a background portion frequently appears in a photograph image region and appears around bi-level and screen-tone images and which does not ignore the background portion.

According to such a method, if a very large number of patterns (background portion patterns) are generated in a background portion, they are discriminated as a photograph image region or an intermediate region. When bi-level patterns are present to a certain degree or more and background portion patterns are also present, these patterns are discriminated as a bi-level image by a simple smoothing method. If screen-tone patterns are present to a certain degree or more and background portion patterns are also present, these patterns are discriminated as a screen-tone image. When bi-level and screen-tone image patterns are present to about the same degree, substantially the same discrimination as in smoothing is performed.

This processing can be realized by performing addition for each pattern assigned to 3 bits of character-likelihood signal 734 shown in FIG. 40, and by making decision by majority after the sum is nonlinearly weighted. When a discrimination signal is obtained based on such large-area processing and used, binarization can be reliably performed at an edge portion of a bi-level image, and a sharp output image can be obtained. An image around a screen-tone image and a photograph image can be smoothed, and a natural image can be obtained.

When signal processing unit 710 shown in FIG. 36 is applied to a conventional monochrome copying machine, color converting circuit 708 shown in FIG. 36 is omitted. In this case, signal processing unit 710 directly receives the output signal from compensation circuit 706 for performing shading compensation, i.e., a sensitivity-compensated image signal, and performs the same operation as described above.

What is claimed is:

1. An image signal processing apparatus comprising:
image input means for optically scanning an input image and for generating an electrical image signal which represents the input image; and
image output means for producing a copy image which corresponds to the input image at limited levels of printing density, the improvement comprising:
  (a) first processing means, connected to said image input means to receive the image signal, for at least partially discriminating a type of the input image based on a pattern matching technique, and for producing a discrimination signal which specifies a discriminated type of the input image in a pixel region thereof having a predetermined size;
  (b) second processing means, connected to said image input means to receive the image signal and connected to said first processing means, for performing a different kind of image signal correction processing which is selected in accordance with the discriminated type of the input image, and for producing a corrected image signal in response to the discrimination signal; and
  (c) third processing means, connected to said second processing means to receive the corrected image signal, for performing multi-value dither processing of the corrected image signal, and for producing a drive signal for said image output means, said drive signal defining a printing pixel pattern with respect to each pixel of the input image.

2. The apparatus according to claim 1, wherein said image input means comprises:
color image sensor means for optically scanning the input image, and for producing color signals with respect to each pixel of the input image as said image signal.

3. The apparatus according to claim 2, wherein said image output means comprises:
a color printing unit for producing a color hard copy using inks of predetermined colors, said printing unit including one of a thermal printer and a laser printer.

4. The apparatus according to claim 3, further comprising:
color conversion means, connected to said image sensor means, for converting the color signals into ink amount designation signals for said color printing unit, said first and second processing means being connected to said color conversion means.

5. The apparatus according to claim 4, wherein said first processing means performs image type discrimination for each of the ink amount designation signals.

6. The apparatus according to claim 5, wherein said second processing means performs image signal correction for each of the ink amount designation signals.

7. The apparatus according to claim 6, wherein said second processing means
(1) performs first correction processing for emphasizing high-frequency components of the ink amount designation signals when the discriminated image type indicates a screen-tone image;
(2) performs second correction processing including signal processing for performing gamma correction to emphasize an edge of the image for the ink amount designation signals when the discriminated image type indicates a bi-level image having the edge; and
(3) performs third correction processing between the first and second correction processing operations when the discriminated image type indicates a halftone image.

8. The apparatus according to claim 7, wherein said first processing means produces a multi-value signal representing the pattern matching result as some levels of probabilities as the discrimination signal.

9. The apparatus according to claim 4, wherein said first processing means comprises:
first decision means for receiving the ink amount designation signals, for performing first pattern matching processing for pixel regions having a predetermined number of pixels, and for producing a first pattern matching result signal; and
second decision means, connected to said first decision means to receive the first pattern matching result signal, for performing second pattern matching processing based on the first pattern matching result signal, and for producing a second pattern matching result signal which is more precise than the first pattern matching result signal.

10. The apparatus according to claim 4, wherein said color conversion means comprises:
first conversion means for performing primary conversion for converting first-system color signals into second-system color signals by a table look-up, and for independently adjusting one of hue and density of the input image;
addition means, connected to said first conversion means, for adding the second-system color signals to produce a sum signal; and
second conversion means, connected to said addition means, for performing secondary conversion for converting the sum signal into third-system color signals by a table look-up and independently adjusting the other of hue and density of the input image.

11. An image signal processing apparatus comprising:
image input means for optically scanning an input image and for generating an electrical image signal which represents the input image, said image input means comprising a proximity linear image sensing unit having linear image sensor sub-units, the improvement comprising:
(a) light source means, provided to said image input means, for emitting light having discontinuous spectral distribution characteristics in order to optically scan the input image;
(b) color-separation filter means, provided to each of said linear image sensor sub-units and having discontinuous spectral distribution characteristics in accordance with those of said light source means, for reducing or removing color nonuniformity caused by a variation in sensing characteristics among said image sensor sub-units; and
(c) compensation means for performing compensation processing including shading compensation and sensitivity nonuniformity compensation of the image signal by one-dimensional non-linear conversion and addition/subtraction.

12. The apparatus according to claim 11, wherein said image sensor sub-units are arrayed in a zig-zag manner along a main scanning direction of said image sensing unit, and wherein each of said image sensor sub-units has an analog line memory.

13. The apparatus according to claim 12, further comprising:
additional delay memory means for compensating for a delay time in an image readout signal generated along a sub-scanning direction of said image sensing unit due to the zig-zag array of said image sensor sub-units.

14. The apparatus according to claim 13, further comprising:
hue compensation means, connected to said image input means, for receiving color signals for each pixel from said image sensor sub-units, and for producing a compensation matrix for a certain pixel by adding a unit matrix of the certain pixel and a difference matrix corresponding to a difference between the unit matrix of the certain pixel and unit matrices of other pixels adjacent to the certain pixel.

15. The apparatus according to claim 14, wherein said hue compensation means separately calculates the unit matrix of the certain pixel and the difference matrix corresponding to a difference between the unit matrix of the certain pixel and unit matrices of other pixels adjacent to the certain pixel.

16. A color copying machine comprising:
scanner means for optically scanning an input original image and for generating color signals for each pixel of the input image as an image signal representing the input image, said scanner means comprising a proximity linear sensor image sensing unit having an array of linear image sensor sub-units;
color printer means for producing a copy image corresponding to the input image at limited levels of printing density; and
color conversion means for converting the color signals into ink amount designation signals of the color printer means, the improvement comprising:
(a) light source means, provided to said scanner means, for emitting light having discontinuous spectral distribution characteristics in order to optically scan the input image;
(b) color separation filter means, provided to each of said linear image sensor sub-units and having discontinuous spectral distribution characteristics in accordance with those of said light source means, for reducing or removing color nonuniformity of the image signal caused by a variation in sensing characteristics among said image sensor sub-units;
(c) first processing means, connected to said color conversion means, for at least partially discriminating a type of the input image based on a pattern matching technique, and for producing a discrimination signal which specifies a discriminated type of the input image in a pixel region of a predetermined size of the input image;
(d) second processing means, connected to said color conversion means and said first processing means, for performing a different kind of image signal correction processing which is selected in accordance with the discriminated type of the input image in response to the discrimination signal, and for producing a corrected image signal; and
(e) third processing means, connected to said second processing means, for performing multi-value dither processing of the corrected image signal, and for producing a drive signal for said printer means, said drive signal defining a printing pixel pattern for each pixel of the input image.

* * * * *

UNITED STATES PATENT AND TRADEMARK OFFICE
CERTIFICATE OF CORRECTION

PATENT NO. : 4,926,251

DATED : MAY 15, 1990

INVENTOR(S) : HIDEKAZU SEKIZAWA ET AL.

It is certified that error appears in the above-identified patent and that said Letters Patent is hereby corrected as shown below:

ON TITLE PAGE:

THE TITLE SHOULD BE CORRECTED AS FOLLOWS:

--COLOR IMAGE PROCESSING APPARATUS WITH IMAGE SIGNAL CORRECTOR--.

THE FOLLOWING SHOULD BE ADDED TO THE FOREIGN APPLICATION PRIORITY DATA:

--Mar. 3, 1988 [JP]  Japan .........63-50189--

Signed and Sealed this

Fifteenth Day of September, 1992

Attest:

DOUGLAS B. COMER

*Attesting Officer*   *Acting Commissioner of Patents and Trademarks*